US008566159B2

(12) United States Patent
King et al.

(10) Patent No.: US 8,566,159 B2
(45) Date of Patent: Oct. 22, 2013

(54) LOCATION-AWARE ADVERTISING TO PARKING LOCATION USERS

(75) Inventors: David W. King, Rancho Santa Fe, CA (US); Chad P. Randall, San Diego, CA (US)

(73) Assignee: IPS Group, Inc., San Diego, CA (US)

( * ) Notice: Subject to any disclaimer, the term of this patent is extended or adjusted under 35 U.S.C. 154(b) by 644 days.

(21) Appl. No.: 12/875,959

(22) Filed: Sep. 3, 2010

(65) Prior Publication Data

US 2011/0060653 A1      Mar. 10, 2011

Related U.S. Application Data

(60) Provisional application No. 61/240,139, filed on Sep. 4, 2009.

(51) Int. Cl.
*G06Q 30/00* (2012.01)

(52) U.S. Cl.
USPC .................................... 705/14.53; 705/14.58

(58) Field of Classification Search
USPC ........................................... 705/14.53, 14.58
See application file for complete search history.

(56) References Cited

U.S. PATENT DOCUMENTS

| | | | |
|---|---|---|---|
| 2,161,046 A | 6/1939 | Hitzeman | |
| 2,832,506 A | 4/1958 | Hatcher | |
| 4,812,805 A | 3/1989 | Lachat et al. | |
| 4,823,928 A | 4/1989 | Speas | |
| 4,825,425 A | 4/1989 | Turner | |
| 4,875,598 A | 10/1989 | Dahl | |
| 4,880,097 A | 11/1989 | Speas | |
| 5,065,156 A | 11/1991 | Bernier | |
| 5,222,076 A | 6/1993 | Ng et al. | |
| 5,442,348 A | 8/1995 | Mushell | |
| 5,563,491 A | 10/1996 | Tseng | |
| 5,614,892 A | 3/1997 | Ward, II et al. | |

(Continued)

FOREIGN PATENT DOCUMENTS

| | | |
|---|---|---|
| CA | 2377010 | 12/2001 |
| EP | 0980055 B1 | 2/2000 |

(Continued)

OTHER PUBLICATIONS (Cell Net Data Systems) "First Wireless Monitoring of Parking Meters Results in Theft Arrests Using CellNet Data Systems Technology," PRNewswire, May 11, 1999, 2 pages.

(Continued)

*Primary Examiner* — Donald L. Champagne
(74) *Attorney, Agent, or Firm* — Wilson, Sonsini, Goodrich & Rosati

(57) ABSTRACT

A payment system for parking locations communicates with a plurality of parking meters, each of which is associated with a predetermined geographic location corresponding to a parking location. The system receives user identifying information via a communication related to payment for a parking session at a parking location identified by the communication, and determines a user credit/debit card data for payment of the parking session based on the user identifying information. Data related to the parking session at the geographic location of the parking meter is stored in a database associated with a parking history of the user, and determines one or more advertisements to communicate to the user based on the geographic location of the parking meter and previously stored data related to the parking history of the user.

20 Claims, 21 Drawing Sheets

(56) References Cited

U.S. PATENT DOCUMENTS

| | | |
|---|---|---|
| 5,617,942 A | 4/1997 | Ward et al. |
| 5,659,306 A | 8/1997 | Bahar |
| 5,841,369 A | 11/1998 | Sutton et al. |
| 5,852,411 A | 12/1998 | Jacobs et al. |
| 6,111,522 A | 8/2000 | Hiltz et al. |
| 6,116,403 A | 9/2000 | Kiehl |
| 6,230,868 B1 | 5/2001 | Tuxen et al. |
| 6,309,098 B1 | 10/2001 | Wong |
| 6,312,152 B2 | 11/2001 | Dee et al. |
| 6,457,586 B2 | 10/2002 | Yasuda et al. |
| 6,505,774 B1 | 1/2003 | Fulcher et al. |
| 6,747,575 B2 | 6/2004 | Chauvin et al. |
| 7,183,999 B2 | 2/2007 | Matthews et al. |
| 7,237,716 B2 | 7/2007 | Silberberg |
| 7,933,841 B2 * | 4/2011 | Schmeyer et al. .............. 705/64 |
| 2001/0012241 A1 | 8/2001 | Dee et al. |
| 2001/0047278 A1 | 11/2001 | Brookner et al. |
| 2001/0051531 A1 | 12/2001 | Singhal et al. |
| 2003/0092387 A1 | 5/2003 | Hjelmvik |
| 2003/0128136 A1 | 7/2003 | Spier et al. |
| 2003/0144972 A1 | 7/2003 | Cordery et al. |
| 2003/0179107 A1 | 9/2003 | Kibria et al. |
| 2004/0068434 A1 | 4/2004 | Kanekon |
| 2004/0181496 A1 | 9/2004 | Odinotski et al. |
| 2004/0264302 A1 | 12/2004 | Ward |
| 2005/0192911 A1 | 9/2005 | Mattern |
| 2006/0149684 A1 | 7/2006 | Matsuura et al. |
| 2006/0152349 A1 | 7/2006 | Ratnakar |
| 2007/0016539 A1 | 1/2007 | Groft et al. |
| 2007/0094153 A1 | 4/2007 | Ferraro |
| 2007/0136128 A1 | 6/2007 | Janacek et al. |
| 2008/0071611 A1 | 3/2008 | Lovett |
| 2008/0093454 A1 | 4/2008 | Yamazaki et al. |
| 2008/0208680 A1 * | 8/2008 | Cho ................................. 705/13 |
| 2008/0238715 A1 | 10/2008 | Cheng et al. |
| 2009/0109062 A1 | 4/2009 | An |
| 2009/0159674 A1 | 6/2009 | King et al. |

FOREIGN PATENT DOCUMENTS

| | | |
|---|---|---|
| JP | 2002-099640 A | 4/2002 |
| JP | 2005-267430 A | 9/2005 |
| KR | 10-2005-0038077 A | 4/2005 |

OTHER PUBLICATIONS

Flatley, Joseph L., "In San Francisco, Hackers Park for Free", *Read* filed under Misc. Gadgets, downloaded from www.engadget.com website on May 3, 2010, originally posted on Jul. 31, 2009, 5 pages.

International Search Report dated Oct. 27, 2008 in PCT application No. PCT/IB06/054574, 2 pages.

Meter Solutions, Single-Space Meters brochure, downloaded from www.duncansolutions.com website, revised Apr. 2006, 2 pages.

International Search Report dated Apr. 26, 2011 in PCT Application No. PCT/US2010/047907, 3 pages.

International Search Report dated Mar. 30, 2011 in PCT Application No. PCT/US2010/047906, 3 pages.

International Preliminary Report on Patentability dated Mar. 15, 2012 for International Application No. PCT/US2010/047907, 6 pages.

International Preliminary Report on Patentability dated Mar. 6, 2012 for International Application No. PCT/US2010/047906, 5 pages.

International Preliminary Report on Patentability dated Mar. 10, 2009 in PCT application No. PCT/IB06/054574, 5 pages.

* cited by examiner

Main Menu | Monthly Statistics
Monthly Statistics
Year: 2008 ⟳ Refresh

As of 4/13/2008

|                   | Jan    | Feb     | Mar     | Apr     | May | Jun | Jul | Aug | Sep | Oct | Nov | Dec |
|-------------------|--------|---------|---------|---------|-----|-----|-----|-----|-----|-----|-----|-----|
| Active Poles      | 27     | 55      | 46      | 46      |     |     |     |     |     |     |     |     |
| Total Cash        | $265   | $4,172  | $7,537  | $2,996  |     |     |     |     |     |     |     |     |
| Total Credit      | $63    | $1,215  | $2,372  | $1,000  |     |     |     |     |     |     |     |     |
| Total Revenue     | $328   | $5,387  | $9,909  | $3,996  |     |     |     |     |     |     |     |     |
| Avg Cash/Pole     | $10    | $76     | $164    | $65     |     |     |     |     |     |     |     |     |
| Avg Credit/Pole   | $2     | $22     | $52     | $22     |     |     |     |     |     |     |     |     |
| Avg Revenue/Pole  | $12    | $98     | $216    | $87     |     |     |     |     |     |     |     |     |
| # Cash            | 295    | 5,399   | 9,705   | 3,847   |     |     |     |     |     |     |     |     |
| # Credit          | 46     | 768     | 1,443   | 556     |     |     |     |     |     |     |     |     |
| # Total           | 341    | 6,167   | 11,148  | 4,403   |     |     |     |     |     |     |     |     |
| Avg # Cash/Pole   | 11     | 98      | 211     | 84      |     |     |     |     |     |     |     |     |
| Avg # Credit/Pole | 2      | 14      | 31      | 12      |     |     |     |     |     |     |     |     |
| Avg # Total/Pole  | 13     | 112     | 242     | 96      |     |     |     |     |     |     |     |     |
| Avg Cash Trans    | $0.90  | $0.77   | $0.78   | $0.78   |     |     |     |     |     |     |     |     |
| Avg Credit Trans  | $1.37  | $1.58   | $1.64   | $1.80   |     |     |     |     |     |     |     |     |
| Avg Trans         | $0.96  | $0.87   | $0.89   | $0.91   |     |     |     |     |     |     |     |     |

FIG. 11A

Main Menu | Zone Revenue | Area Revenue
Area Revenue
From Date: 3/14/2008  From Time: 00:00:00
To Date: 4/13/2008    To Time: 23:59:59  ⟳ Refresh Zone: Laguna Beach Route 1

| Area          | Cash      | Credit    | Cash % | Credit % | Total       |
|---------------|-----------|-----------|--------|----------|-------------|
| Laguna Street | $7,733.40 | $2,493.25 | 76%    | 24%      | $10,226.65  |
| Grand Total   | $7,733.40 | $2,493.25 | 76%    | 24%      | $10,226.65  |

FIG. 11B

| Settlement Date | Transaction Reference | Machine Reference | Last 4 Digits | Card Scheme | Amount |
|---|---|---|---|---|---|
| 4/12/2008 | d8fca3a1-bc08-dd11-a48c-00123f67eea8 | 0020159 | 4645 | Mastercard | $1.00 |
| 4/12/2008 | dcfca3a1-bc08-dd11-a48c-00123f67eea8 | 0020155 | 4697 | Visa | $1.75 |
| 4/12/2008 | defca3a1-bc08-dd11-a48c-00123f67eea8 | 0020159 | 7310 | Mastercard | $1.00 |
| 4/12/2008 | 60dc210c-be08-dd11-a48c-00123f67eea8 | 0020176 | 3228 | Visa | $3.00 |
| 4/12/2008 | 74295075-bf08-dd11-a48c-00123f67eea8 | 0020180 | 1201 | Mastercard | $1.50 |
| 4/12/2008 | 7a295075-bf08-dd11-a48c-00123f67eea8 | 0020181 | 7676 | Visa | $1.00 |
| 4/12/2008 | 7d295075-bf08-dd11-a48c-00123f67eea8 | 0020180 | 8202 | Visa | $4.00 |
| 4/12/2008 | 19fdefd9-c008-dd11-a48c-00123f67eea8 | 0020185 | 9832 | Visa | $1.00 |
| 4/12/2008 | d2c56de0-c008-dd11-a48c-00123f67eea8 | 0020179 | 5733 | Visa | $1.00 |
| 4/12/2008 | d3c56de0-c008-dd11-a48c-00123f67eea8 | 0020179 | 5733 | Visa | $1.00 |
| 4/12/2008 | dac56de0-c008-dd11-a48c-00123f67eea8 | 0020179 | 5733 | Visa | $1.00 |
| 4/12/2008 | dbc56de0-c008-dd11-a48c-00123f67eea8 | 0020179 | 5733 | Visa | $1.00 |
| 4/12/2008 | ddc56de0-c008-dd11-a48c-00123f67eea8 | 0020185 | 9832 | Visa | $1.00 |

FIG. 12

Main Menu | Coin Collection
Coin Collection
Collection Date: 12/13/2007

| Pole Serial Number | Collection Time | 1¢ | 5¢ | 10¢ | 25¢ | $1 | Invalid | Cash |
|---|---|---|---|---|---|---|---|---|
| DB0016 | 09:46:17 | 7 | 11 | 10 | 48 | 0 | 0 | $13.62 |
| DB0017 | 09:47:06 | 0 | 24 | 44 | 80 | 0 | 0 | $25.60 |
| DB0018 | 09:46:46 | 0 | 12 | 12 | 89 | 0 | 2 | $24.05 |
| DB0019 | 09:46:48 | 0 | 23 | 15 | 70 | 0 | 0 | $20.15 |

LOCATION-AWARE ADVERTISING TO PARKING LOCATION USERS

This application claims the benefit of U.S. Provisional Application No. 61/240,139 filed Sep. 4, 2009 entitled "Location-Aware Advertising to Parking Location Users," which is incorporated herein by reference for all purposes.

BACKGROUND

Generally, advertising that is more relevant to those viewing the advertising is more effective in spurring desired sales. That is, advertising that is more relevant to a recipient is more likely to result in a purchase decision by the recipient. Advertising that is directed to a recipient based on the recipient's geographical location can be used to tailor the advertising content to the recipient and is one way of increasing the relevance of the advertising. It has been found generally that such location-aware advertising is more effective than undirected "broadcast" advertising.

There are many techniques for determining geographic location of a recipient for purposes of directing advertisements to the recipient. One form of location-aware advertising is at a point-of-sale. Such point-of-sale advertising depends on the physical presence of a person at a location as an indicator of products or services for which the person might be interested. Given that the user's location is essentially the only data item about the user that is known, such techniques are not especially likely to generate relevant advertising and are not especially successful.

One means for determining location for advertising is to use a mobile telephone, also referred to as a cell phone. Using a cell phone for location determination has great appeal, due to the large number of persons who carry a cell phone and the great market penetration of such use.

When a user who subscribes to a cell phone service makes a call, the user's cell phone communicates with the service infrastructure via cell towers. As the user of the cell phone moves about, the cell tower handling the user's call changes according to the user's location. The nearest cell tower usually handles the call. The cell towers are typically spaced apart at distances depending on terrain and usage patterns. Typical cell tower spacing can be as little as approximately ½ mile (1 km) up to as much as 25 miles (40 km). Thus, the cell tower being used by a cell phone helps determine a very approximate location of the cell phone. Some cell phone carriers, by prior arrangement with their cell phone subscribers, may utilize cell phone call records to promote marketing.

It should be apparent that cell tower spacing is not of especially great precision in determining geographic location. Moreover, cell phone location can be extremely transitory, because the cell phone user could be merely travelling through a cell area toward a final destination. This further calls into question the reliability of location determination by cell phone usage. More recently, location determination by the Global Positioning Satellite (GPS) system has been integrated into many mobile devices, such as cell phones (often referred to as "smart phones") and other portable communication devices. Accuracy of position location by the GPS system depends on many factors, such as terrain, weather, visibility of open sky, and the like, but generally provides a geographic location with an accuracy in a range within about thirty feet (10 meters) to less than ten feet (2-3 meters). Such accuracy is an improvement over cell tower spacing for location-aware advertising, but not all cell phone users have GPS-enabled devices, because GPS phones are a relatively recent arrival to the market, and not all users have agreed to make their location data available, due to privacy concerns.

It should be apparent that dependency on physical presence alone, or on mobile devices, for determining geographic location information is not sufficient for reliable directing of advertising content for increasing the likely relevance of the content. What is needed are more reliable techniques for increasing the relevance of location-aware advertising. The present invention satisfies this need.

SUMMARY

As disclosed herein, a payment system for parking locations communicates with a plurality of parking meters, each of which is associated with a predetermined geographic location corresponding to a parking location. The system receives user identifying information via a user communication for payment for a parking session at a parking location identified by the user communication, and determines a user credit/debit card data for payment of the parking session based on the user identifying information. Data related to the parking session at the geographic location of the parking meter is stored in a database associated with a parking history of the user, and determines one or more advertisements to communicate to the user based on the geographic location of the parking meter and previously stored data related to the parking history of the user.

Other features and advantages of the present invention should be apparent from the following description of preferred embodiments that illustrate, by way of example, the principles of the invention

BRIEF DESCRIPTION OF THE DRAWINGS

The invention is now described, by way of a non-limiting example, with reference to the accompanying drawings, in which:

FIGS. 11A and 11B show examples of user interface screens regarding financial data generated by the parking meter management system of FIG. 9.

FIG. 12 shows an example of a user interface screen regarding credit card transactions generated by the parking meter management system of FIG. 9.

FIGS. 13A and 13B show examples of user interface screens regarding coin collection generated by the parking meter management system of FIG. 9.

FIG. 14 shows an example of a user interface screen regarding battery status generated by the parking meter management system of FIG. 9.

FIG. 15 shows an example of a user interface screen regarding terminal events generated by the parking meter management system of FIG. 9.

FIGS. 16A, 16B and 16C show examples of user interface screens regarding meter configuration generated by the parking meter management system of FIG. 9.

Figure 1A:
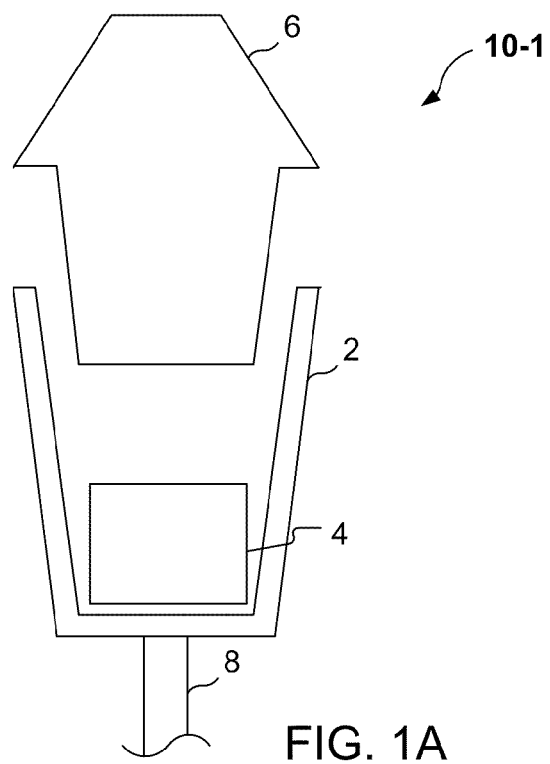
FIGS. 1A, 1B, and 1C are schematic illustrations of embodiments of single space parking meters.

In the appended figures, similar components and/or features may have the same reference label. Further, various components of the same type may be distinguished by following the reference label (e.g. "6") by a dash and a second label that distinguishes among the similar components (e.g. "6-1" and "6-2"). If only the first reference label is used in the specification, the description is applicable to any one of the similar components having the same first reference label irrespective of the second reference label.

DETAILED DESCRIPTION

Described herein is a technique in which the geographic location of a user who completes payment for time at a parking location via a mobile communication system is captured by a parking payment system. The mobile communication system may comprise, for example, a so-called pay-by-cell arrangement that makes use of cell phone communications. Other forms of mobile communication can be accommodated, such as WiFi or Internet-based communications between the user and/or the meter and the parking payment system, such that a user who wants to utilize a parking location initiates communication with the parking payment system and provides identification of a parking location and authorizes payment for using the parking location for a specific duration of time (i.e., for a parking session). The technique may be applied to both single-space and multiple space parking. It should be understood that reference to single-space and multiple space parking is a reference to the fidelity of location identification that automatically occurs with payment. That is, if a parking space is located within a parking lot containing many parking spaces, then it may be that the only geographic location information for persons parking at the lot will be a location associated with the lot as a whole. That is, all vehicles parked in the parking lot may be assigned the same geographic location. Alternatively, each parking space in the lot may be identified with a particular geographic location, which is assigned to the user at the time of making payment for the parking session, in accordance with the discussion herein. Parking locations that are single-space locations will be assumed in this discussion, but it should be understood that the principles described herein can be applied to both single-space and multiple space parking. Examples of single-space parking include on-street, single-stall parking spaces.

A user who wants to use the parking payment system first registers with the system such that the user provides a contact number, such as a cell phone (handheld or in-vehicle) number or other means of making contact with the system, and provides payment card and/or debit card information, or other financial account information, and also agrees to service terms that permit collection of location data related to the parking payments. After registration, the user can pay for using a parking location by initiating communication with the parking payment system and providing information on the parking location and amount of time to be purchased. The amount of time purchased establishes the duration of the parking session for which the user has paid.

The parking location is typically identified to the user by a location number posted on a parking meter pole or other fixed object at the parking location. Each parking location, such as a single-space stall or a meter number or a parking lot, is associated with a unique location number in a database of the parking payment system such that the system can determine a geographic location for assignment to the user by matching the location number given by the user with a predetermined geographic location stored in the database for that location number. The accuracy of the parking location data is only limited by the accuracy of the data in the database, down to inches, if desired. Thus, when the user pays for the parking session, the parking payment system determines the user's parking location, which is associated with a geographic location, and utilizes the geographic location information to direct advertising to the user. That is, determining the user's parking location inherently determines the user's geographical location, corresponding to the parking location, and can specify the location with virtually unlimited accuracy. That information is utilized in location-aware advertising.

In the pay-by-cell arrangement, in which the user pays for the parking session via a cell phone call to the parking payment system, the system determines the user parking location, which corresponds to a precise geographic location that is thereby known to the system, and utilizes the geographic location information to direct advertising to the user. The advertising may be delivered contemporaneously at the time of parking, such as via a text message (e.g., short message service or SMS) or voice call or email message or the like, or the advertising may be delivered at a later delayed time, via text, voice, SMS, or email, or via postal mail or some other means, or a combination of the two techniques for contemporaneous and delayed delivery may be used.

Thus, the geographic location of the parking location at which the pay-by-cell user has just parked is matched to advertising using the known geographic location and any other information desired. The advertising may be purchased by clients of the parking payment system in connection with delivery of advertising wanted by the clients. In this way, the payment system can select advertising, or can provide location information and associated user data to advertising clients for delivery of content. It should be apparent that the advertising content can be directed on a local, regional, or national basis, and can be sent via email, SMS, or text message or voice call to the pay-by-cell user. The advertisement may contain a special promotion code only provided to users who opt to receive such pay-by-cell advertising. In addition, purchases associated to such advertising codes may provide additional benefits to customers, such as in the form of future times for free parking, for example.

Alternatively to the pay-by-cell arrangement, according to one embodiment of a parking meter as described herein, a parking meter includes a radio transceiver for communicating with a parking payment system. As noted, that transceiver can comprise a cell telephone transceiver. Operation of the parking meter includes transmitting radio signals to, and receiving radio signals from, the parking payment system. Alternatively, the communications between the meter and the parking payment system can take place over Internet or WiFi communications, cell phone data networks, voice communications links, email or text messaging, SMS protocols, and the like, so long as parking location and user identification data can be transmitted by the meter to the parking payment system for payment authorization and advertising can be delivered to the user.

General Description

A "meter" as used herein can be any of various devices configured to measure time, distance, speed, or intensity, or to indicate, record, and/or regulate an amount or volume, such as, for example, the flow of a gas or an electric current. As technology has advanced, meters have also become more advanced. Meters that measure the passage of time, e.g., parking meters, typically include timer mechanisms similar to those of mechanical watches. Since these timer mechanisms had limited life spans, the parking meters were constructed with a fixed housing that was configured to receive a replaceable meter unit including the meter timer mechanism. When the timer mechanism wore out, the meter unit could be replaced. Other types of meters that can have replaceable meter units include water meters and gas meters that measure the flow of material, such as water or gas, respectively.

Many mechanical meters have been replaced by digital-based meters. Digital meter units can have longer life spans than their mechanical predecessors, but they still are replaced when they malfunction, are damaged, or even when the technology changes.

With advances in communications, e.g., wireless telecommunications, it is possible to monitor many meters remotely. For example, a group of meters can report information to a central data manager using wireless communications. The information reported can be related to financial transactions such as credit card information or periodic measures such as the amount of gas or water consumed. Meters that communicate local information are often associated with a specific geographic location. For example, a meter might be associated with locations such as a parking spot, a house, a ticket booth, a cash register, a vending machine, and so forth. The central data manager can maintain a database that associates each meter with corresponding meter information such as transactions or consumption measures.

A parking meter is typically associated with a single parking space such that the parking space can be occupied for a predetermined amount of time in accordance with the amount of payment received at the meter. Expiration of the amount of time at the meter exposes the vehicle occupying the parking space to a fine. Advances in meter technology have generally not been propagated for managing parking meter enforcement and parking meter fee payment. Enforcement of parking meter fees is still largely performed by an individual manually traveling to each parking space and checking the time remaining on the associated parking meter. The individual is generally charged with noting violations of fee payment and issuing citations. This is a time-consuming and costly service. As with many tasks, manual involvement produces inefficiencies and unreliability.

For some systems, it is possible to provide payment to a parking meter via a mobile telephone, also referred to herein as a cell telephone. Such payment systems are typically referred to as pay-by-cell systems. The pay-by-cell technology has evolved in the parking industry as a method for cashless payment, as an alternative to cash-based payment and for when debit card, credit card, or other cashless forms of payment are not readily accessible. This has been especially true in the single space parking meter market. The pay-by-cell technology involves each parking meter unit being turned on (i.e., electrical power is applied) at the time a user initiates a paid parking period (i.e., begins a parking session). When the parking meter is turned on, it can communicate with the local cell telephone infrastructure to complete the payment transaction and start the timing process.

The pay-by-cell technique provides a more convenient cashless payment, and can also have the ability to add additional time to a parking space remotely. For example, if a user of a pay-by-cell parking space is stuck in a meeting and knows that it will be necessary to purchase more time before the meeting ends, then the user can do so by the following process, described in Table 1:

TABLE 1

| Step | Operation |
|---|---|
| 1 | User registers with a parking service provider, providing credit card and associated cell phone information for payment of future parking sessions. |
| 2 | User decides to use pay-by-cell in a designated location. |
| 3 | At the designated location, the user initiates power to the parking meter and places a call to a central database of the parking service provider, while the parking meter communicates with the central database. |
| 4 | The user provides information on parking pole/space location and amount of time to be purchased to the central database. |
| 5 | Time is granted and details regarding the purchase are stored in the central database (service provider hosted). |
| 6 | In response to the user payment, the central database communicates the amount of time purchased to the meter at the designated location. |
| 7 | Some time after initiating the parking session, the user can decide to pay additional amounts to extend the time period for the parking session by communicating with the central database and authorizing payment. However, because the parking meters are not always awake (they power-down to save power), the updated time cannot be communicated from the central database to the meter for display. |
| 8 | Because the meter does not display the time added in Step 7, enforcement requires officers to check with the central database for paid time, prior to issuing a citation, because a meter with a display that indicates the parking session has expired may actually have time remaining, due to the Step 7 payment. This need for checking is cumbersome and time consuming, making enforcement difficult. |

The parking meter may be a single space parking meter. Preferably, the single space parking meter displays an amount of time paid for, thereby not requiring a printer to print out tickets such as commonly used in multi-space parking meter systems.

Still further according to the invention, the parking meter device may have a payment received arrangement for receiving an instruction from a call center that payment has been effected, via the call center, from a cell phone.

The parking meter device may have a solar power charging arrangement whereby the power supply unit is recharged by solar energy. The parking meter device may then also have a power management facility.

As a further feature, the parking meter device may have a locating arrangement for determining the location of the parking meter device. The locating arrangement may be GPS operable.

The parking meter device may have a management communication arrangement for communicating management information to a management center. For example such management information may include malfunction details, a tampering alert, duration expiration and the location of the parking meter device.

Embodiments of the disclosure include a method of controlling parking in a single parking bay, which includes accepting payment for parking in the bay by means of coins, parking tokens, a credit or debit card account, a smart card (contact or contactless), from an electronic purse, an RFID tag, or by means of a cellular telephone.

If payment is effected by means of a cellular telephone, then the method may include receiving an authorization signal that payment for the parking has been made. This signal may be provided by the second financial institution or from a control center.

The method of controlling parking may include sensing a vehicle identifier associated with the vehicle that is parking at a parking meter. The vehicle identifier uniquely identifies the vehicle and may comprise a variety of identification mechanisms that associate a unique identifier with the vehicle. For example, the vehicle identifier may be a license plate number that is optically detected. The vehicle identifier may be contained in an RFID tag that is attached to the vehicle. A RFID tag on the vehicle could be activated by a parking sensor that is located in the street in the parking spot. The parking sensor can wirelessly communicate the vehicle identifier to the parking meter. The vehicle identifier may be stored at a management center and linked with a user identifier (e.g., an RFID tag identification number), the credit/debit card, phone information and/or email information of the registered user.

The method of controlling parking may include sensing if a vehicle is parked in the space or bay when the paid-for parking time has expired or the maximum parking time has been exceeded and transmitting a time expired signal to a management centre. A location signal, providing the location of the parking space, may also be transmitted.

The data manager may comprise a plurality of data managers that include one or more local data managers that in turn communicate with a central data manager on behalf of the group or any of its members.

It will thus be appreciated that a predetermined number of single space parking meters, together with an associated local data manager, can form a local group, such that the local data manager communicates with a central data manager.

According to another aspect, a vehicle parking control system includes a number of parking meters that are members of an operational group; an associated local data manager that has a complementary transceiver for receiving radio transmissions from parking meter members of the operational group and a transmitter for transmitting signals to the group members, and a communication facility for communicating with a central data manager, the grouped parking meter members and the associated local data manager forming a local group.

The system may thus include a number of local groups and a central data manager.

It will be appreciated that the local data manager will generally be located less than 150 meters and preferably less than 80 meters from its associated group members.

The transceivers may operate in the 2.4 GHz frequency band and may have a power of between 1 mW and 6 mW. At low power levels, batteries could last for months or even years (e.g., up to three years or more).

The communication facility of the local hub manager may communicate with the central data manager by means of a data channel, which may use a cellular telephone network, a wireless local area network (LAN), a wired LAN or the Internet.

Communications between the parking meters and the central data manager may be in regard to payment authorization, arrival event reporting, payment alerts, time lapse alerts, status reports, fault reporting and/or configuration and software updates.

It will be appreciated by those skilled in the art that the local data managers may concentrate data received from their respective parking meter group members before communicating with the central data manger; synchronized time division multiplexing may be used to keep active transmit and receive times short; data may be encrypted; and messages may be acknowledged to improve reliable delivery.

Each group of parking meters and its associated local data manager may be in the form of a mesh radio network, such that certain parking meters may act as relays for other parking meters that don't have direct communication with the local data manager.

Group members may communicate with members of other groups, as desired for system operation.

As noted above, the communications between the user and the parking meter and the parking payment system may take place over the cell phone network, over Internet or WiFi connections, over mesh networks, SMS networks, text, voice, data, and similar networks, and any combination of these communication schemes. For example, in a pay-by-cell arrangement, the communications between the three entities (user, parking meter, parking payment system) will typically be direct and will typically take place entirely over a cell phone communications network. The primary embodiments described herein will be provided in the context of a mesh network, but it should be understood that the other means of communications are also sufficient for the features described herein.

In FIG. 1A, an embodiment of a single space parking meter is designated generally by the reference numeral 10-1. The parking meter 10-1 includes a location housing 2, a cash collection box 4, and a meter unit 6. The location housing 2 is fixedly attached to a pole 8 associated with a parking space at a geographic location, with the cash collection box 4 and the meter unit 6 being received in the location housing. The meter unit 6 is a removable meter unit that can be replaced independently of other components of the meter 10-1 such as the housing 2 and cash collection box 4. The cash collection box is also removable and can also be replaced independently of the other meter components.

Figure 1B:
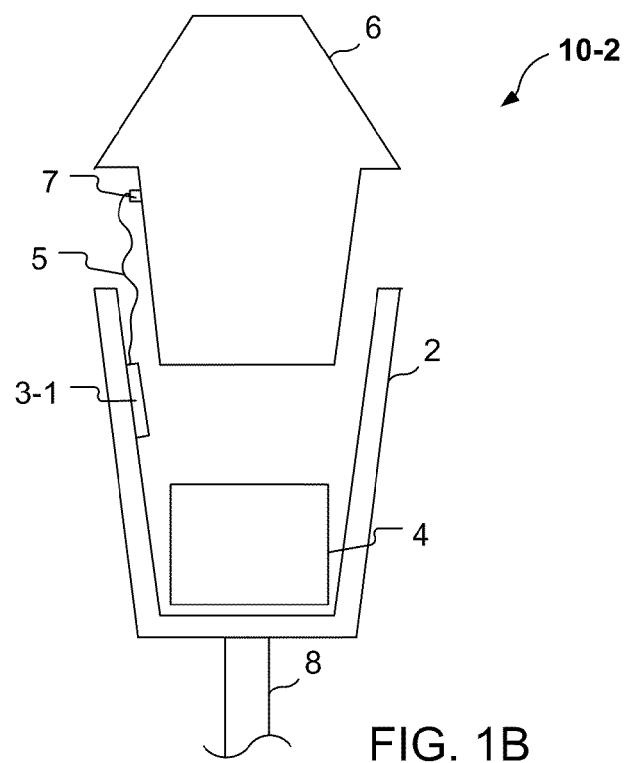

In FIG. 1B, another embodiment of a single space parking meter is designated generally by the reference numeral 10-2. The parking meter 10-2 includes the location housing 2, the cash collection box 4, the meter unit 6, and an auxiliary device 3-1 in the form of a tag. The cash collection box 4, the meter unit 6, and the tag 3-1 are received within the housing 2. The housing 2 is fixedly attached to the pole 8. The tag 3-1 is permanently attached to an inner surface of the housing 2. Attachment to an inner surface shields the tag from the outside environment and helps prevent damage and vandalism to the tag. The cash collection box 4 and meter unit 6 are removable and replaceable. In the example shown in FIG. 1A, the tag 3-1 is connectable to the meter unit 6 by means of a length of wire 5 and a plug-in connector 7 at the meter unit, and can be powered by the meter unit (e.g., by a battery, solar cell, or other power source associated with the meter unit). The tag 3-1 is useful for associating the collection box 4 and meter unit 6 with the location.

Figure 1C:
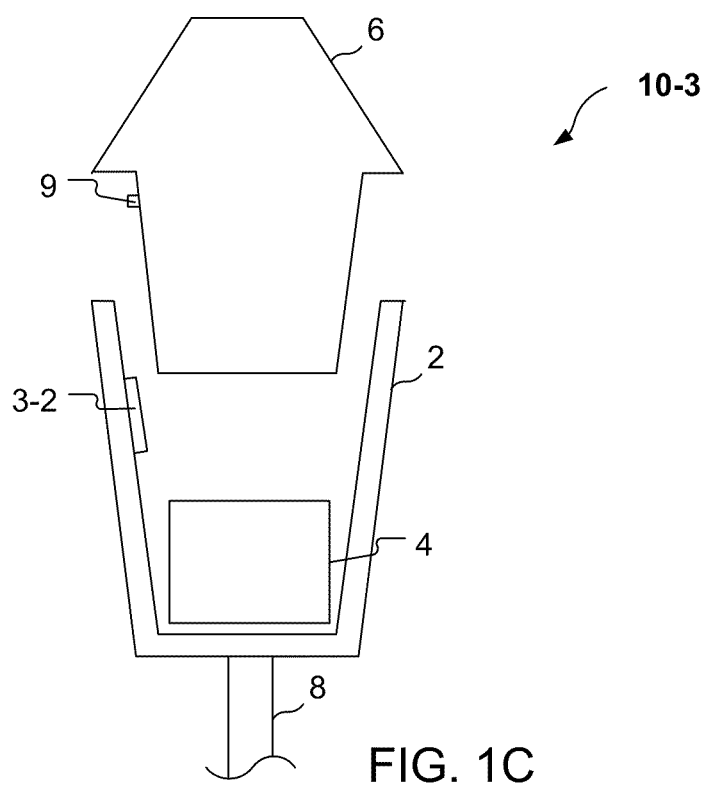

Referring to FIG. 1C, another embodiment of a single space parking meter is designated generally by the reference numeral 10-3. The parking meter 10-3 is similar to the parking meter 10-2 of FIG. 1B except that the parking meter 10-3 includes a wireless tag 3-2 and the meter unit 6-2 includes a wireless transceiver 9. The wireless tag 3-2 communicates wirelessly with the meter unit and can be, for example, an RFID tag, a smart card, an ID token, or the like. The wireless transceiver 9 receives information from the tag 3-2 and, for example, can be a radio transceiver that uses WiFi, Bluetooth, WiMax, or other short range wireless radio technology, in accordance with the wireless communication channel used by the tag.

In some embodiments, such as, for example, where the tag 3-2 is an RFID and/or a smart card, the wireless tag 3-2 is powered by the signal transmitted by the transceiver 9. In other embodiments, the wireless tag 3-2 can be powered by a battery. Since the distance from the wireless transceiver 9 to the tag 3-2 is relatively small, the power consumed by the wireless transceiver 9 and/or the tag 3-2 can be very low, such that a relatively small capacity battery that is compact provides sufficient power to the transceiver and/or tag for operation without need for hibernation or sleep modes. That is, the transceiver 9 is always available to receive communications and transmit data. In some embodiments and deployments, the meters 10 can be powered by solar panels such as photovoltaic structures, which can supplement or replace battery power. The self-powered feature eliminates the need for wired power connections from an electrical supply utility grid to the meters.

The wireless transceiver 9 of the parking meter 10-3 could be an Infrared (IR) transceiver that emits an infrared beam for data communication. In that case, the transceiver 9 is aligned with the tag 3-2 such that the infrared beam of the transceiver is properly targeted at the tag 3-2.

In one embodiment, the wired tag 3-1 or the wireless tag 3-2 is used to monitor the content of the cash collection box 4, as will be explained further below. Each tag 3 has a unique identifier that identifies the parking meter 10 with which it is used, and that is associated with a unique physical location where the parking meter is fixedly located, e.g., the location of the pole 8 and the location housing 2.

The wireless transceiver 9 can be configured to receive a signal from a parking sensor associated with the physical location. For example, the signal from the parking sensor can signal an arrival event at the location that is associated with the tag 3 that is fixedly identified with the physical location. Details of methods and apparatus for providing and reporting the arrival event signal are discussed further below.

Preferably, the location housing 2 is configured to permanently receive the tag 3. In the context of the present description, permanently receiving the tag 3 means that the tag is affixed to the location housing 2 such that the tag cannot be removed without leaving clear physical evidence of its removal from the location housing, and/or such that removal makes the tag 3 inoperable. The tag 3 can be permanently affixed with an adhesive glue, double sided tape, single sided tape, soldering, and similar techniques that will be known to those skilled in the art.

The embodiment of the location housing 2 in FIGS. 1A, 1B, and 1C is a clam-shell type of housing that is affixed to the pole 8 and is configured to mate with a removable meter unit 6. In other embodiments, however, the location housing 2 can be a cabinet or other enclosed space that is configured to mate with one or more removable meter units, where the removable meter units are configured to be mated in compartments or sockets of the cabinet, such that each of the compartments is associated with a physical location that is not necessarily at the same location as the cabinet or the compartment. In other embodiments, the location housing can be another type of receptacle fixedly placed and associated with a physical location.

Figure 2A:
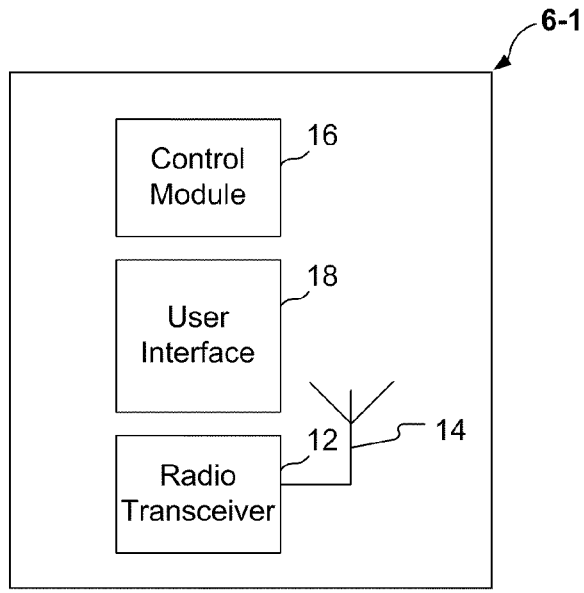
FIG. 2A shows a functional block diagram of a removable meter unit used in the parking meter of FIG. 1A.

FIG. 2A is a functional block diagram of a removable meter unit that can be used in the meter 10-1 of FIG. 1A and is designated generally by reference numeral 6-1. The removable meter unit 6-1 includes a radio transceiver 12, an antenna 14, a control module 16, and a user interface 18 through which payment can be received. As indicated above, the parking meter 10 is self-powered and, and as described more fully below, communicates with a local data manager via the radio transceiver 12 and operates under control of the control module 16.

The control module 216 includes one or more processors such as application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, and/or a combination thereof. The control module 16 also includes one or more storage mediums. A storage medium can include one or more memories for storing data, including read only memory (ROM), random access memory (RAM), magnetic RAM, core memory, magnetic disk storage mediums, optical storage mediums, flash memory devices and/or other machine readable mediums for storing information.

The user interface 18 provides a means for a location user to interact with the meter unit 6-1 and can include, for example, a display, one or more lights, and a keypad. The user interface 18 can provide a payment interface including a currency receiver for receiving coins and/or bills from a user in payment for using the parking location, as well as a reader for processing credit cards, debit cards, payment tokens, and the like. The control module 16 is coupled to the user payment interface and is configured to receive payment information regarding the amount of a payment and/or card or token information received at the payment interface. The control module 16 communicates the payment information from the user interface 18, via the radio transceiver 12, with the local data manager. The one or more lights of the user interface 18 can be used as an indicator as to the payment status or, as discussed further below, can be used to produce an indication that a parking space that is associated with the location of the meter 10 is occupied.

Figure 2B:
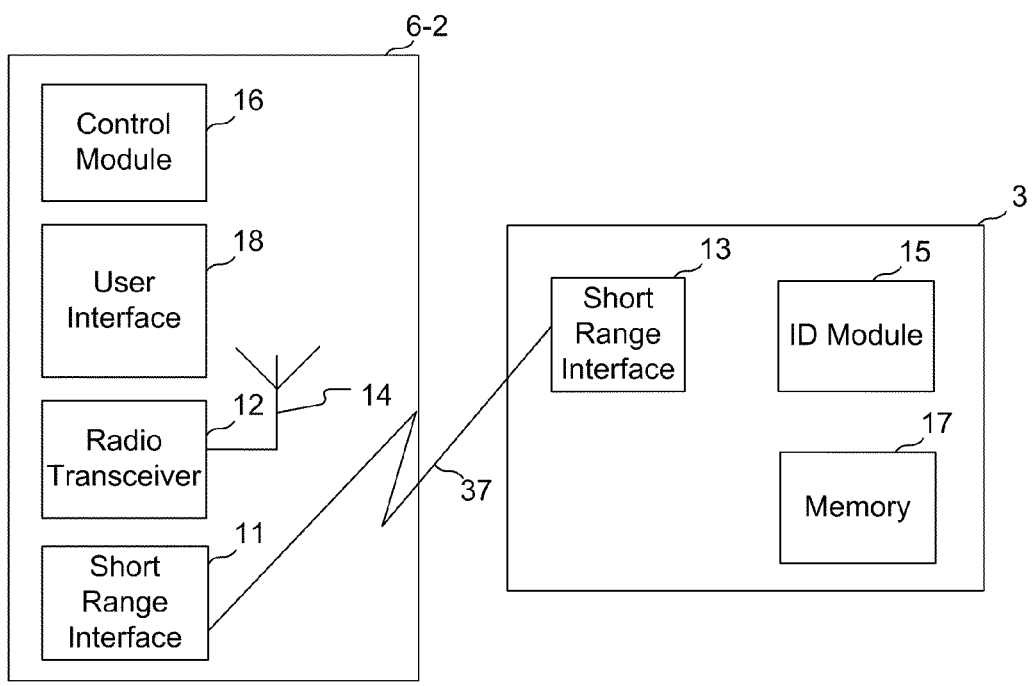
FIG. 2B shows a functional block diagram of a removable meter unit and a tag device used in the parking meters of FIGS. 1B and 1C.

FIG. 2B shows functional block diagrams of an exemplary removable meter unit 6-2 and a tag 3 that can be used in meters such as the meters 10-2 and 10-3 of FIGS. 1B and 1C. The meter unit 6-2 includes similar components to the meter unit 6-1 in FIG. 2A, including the radio transceiver 12, the antenna 14, the control module 15, and the user interface 18. In addition, the meter unit 6-2 also includes a short range interface 11 by means of which it communicates with the tag 3. The tag 3 has a short range interface 13, an ID module 15, and an optional memory module 17 for storing information regarding operating parameters including a payment collection history and/or configuration settings. Operating parameters that effect the configuration settings of the removable meter unit can include such things as a parking rate, a geographic location, parking rules, an amount of currency in a cash box and times when parking rates or rules apply, and so forth. The meter unit 6-2 is linked to the tag 3 for data communications by a link 37. In the case where the tag 3 is a wired tag 3-1, the link 37 is the wire 5. In the case where the tag 3 is a wireless tag 3-2, the link 37 can be a radio link or an optical link. In the case of a wireless tag 3-2, the short range interfaces 11 and 13 can be any type of near-field communication (NFC) devices such as, for example, RFID devices, Bluetooth devices, WiFi devices, IR devices, smart card devices, and the like.

In one embodiment, the control module 16 communicates the payment information, via the link 37, to the short range interface 13 of the tag 3. The short range interface 13 then updates the optional memory module 17 based on the received payment information. The memory module 17 can add the amount of currency indicated to have been received by the received payment information to the stored amount. In addition, the memory module 17 can also receive and store transaction-time information including the date and time of day that the payment was received.

The ID module 15 stores a unique identifier, e.g., a serial number, that is associated with the tag 3. Preferably, the unique identifier of the tag 3 and the value stored in the memory module 17 are externally readable via the short range interface 13. The identifier of the tag 3 and value stored in the memory module 17 may be read, for example, by a suitable reader (not illustrated). If the short range interface 13 is an RFID module, then the reader could be an RFID reader. Other types of readers that can be used depend on the configuration of the tag and module, but can include devices such as IR readers, smart card readers (contact or non-contact), plug-in readers, and the like. In this way, periodic downloading of the value stored in the memory module 17 and the identifier of the associated tag 3 can be performed in order to monitor how much cash should be in the cash collection box 4 (FIG. 1). This downloaded cash value can then be used to catch a thief that is pocketing some of the cash.

In one embodiment, the payment collection history information stored in the memory module 17 can be externally reset to zero whenever the cash collection box 4 is emptied or replaced. In one aspect of this embodiment, the removable meter unit 6-2 automatically detects when the cash collection box 4 is removed. This can be accomplished using a sensor such as a motion sensor, an IR sensor, a magnetic field sensor, or the like.

When the removable meter unit 6-2 detects that the cash collection box 4 is removed, the short range interface 11 of the removable meter unit 6-2 communicates a signal to the short range interface 13 of the tag 3. In response to the signal indicating removal of the cash collection box 4, the short range interface 13 of the tag 3 resets the payment collection history stored in the memory module 17 to indicate no collection history and, preferably, stores the total amount of currency collected since the last cash collection box removal in the memory module 17. In another aspect of this embodiment, the tag 3 is configured to detect the removal of the cash storage box 4 and to autonomously reset the payment history and store the total amount of currency collected into the memory module 17.

Figure 3:
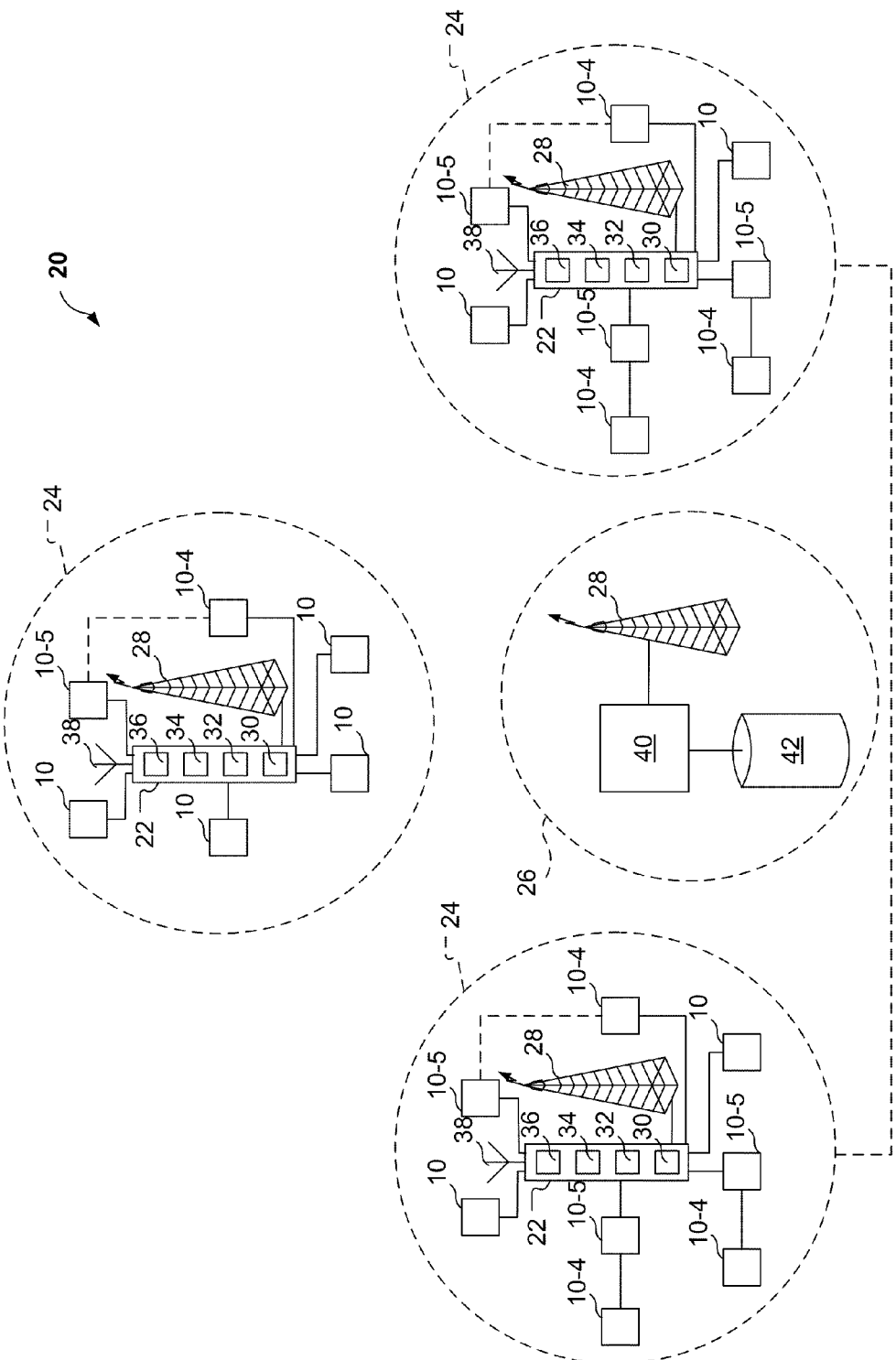
FIG. 3 is a schematic illustration of a parking meter system which uses a number of the parking meters of FIGS. 1A, 1B and/or 1C.

Referring to FIG. 3, a parking meter system that uses a number of the parking meters of FIGS. 1A, 1B and/or 1C is designated generally by the reference numeral 20. The system 20 utilizes a number of the parking meters 10. In general, the system includes one parking meter 10 for each parking space. The parking meters 10 can be, for example, any of the parking meters 10-1, 10-2, or 10-3 shown in FIGS. 1A, 1B, and 1C, respectively, that include the removable meter unit 6 with the radio transceiver 12. The parking meters 10 are operated according to groups, such that a predetermined number of parking meters 10 comprise group members and each group includes a local data manager 22. Thus, each group of parking meters 10 and its associated local data manager 22 form a local group 24. In FIG. 3, each operational group is indicated by a dashed line. In one embodiment, there are approximately thirty parking meters 10 in each local group 24. For simplicity of illustration, not all the parking meters 10 are shown in the local groups 24 illustrated in FIG. 3. The local data manager 22 can perform management tasks associated with maintaining the parking meters 10 in proper operational condition, in addition to performing communications with all of the group members. The local data manager will generally require resources greater than required by the parking meters to perform their respective functions.

Each of the local data managers 22 communicates with a central data manager 26. In the example system 20 this is effected by means of a cellular telephone network, with each local data manager 22 and the central data manager 26 being connected to a base station 28 of the cellular telephone network. Data links are thereby established between the local data managers 22 and the central data manager 26. The central data manager 26 can perform management tasks associated with maintaining the local data managers 22 in proper operational condition and managing operations of the system. The central data manager will generally require resources greater than required by the local data managers to perform their respective functions. If desired, one of the local data managers can be operated as, and perform the functions of, the central data manager. It should be apparent that a local data manager performing the functions of a central data manager must have sufficient resources to perform such functions. In FIG. 3, the central data manager 26 is generally indicated by dashed lines. Although only three local groups 24 are shown in FIG. 3, it should be understood that there can be more or fewer of the local groups 24.

Each local data manager 22 has a modem 30, a control device 32, a memory 34, and a radio transceiver 36 with an antenna 38. As indicated above, each local data manager 22 communicates with the parking meters 10 in its local group 24 via its radio transceiver 36 and the radio transceiver 12 of the parking meter 10. The local data managers 22 may do so directly, or indirectly via another parking meter 10 as indicated with parking meters 10-4 and 10-5 in FIG. 3.

The memory 34 of a data manager 22 can include one or more memories for storing data, including read only memory (ROM), random access memory (RAM), magnetic RAM, core memory, magnetic disk storage mediums, optical storage mediums, flash memory devices and/or other machine readable mediums for storing information. The memory 34 stores the payment collection history information received from the parking meters 10 in the local group 60. The payment collection history information stored in the memory 34 is communicated to the central data manager 26 via the modem 30, the base station 28 and any intervening networks such as, for example, the Internet.

The control device 32 comprises one or more processors coupled to the memory 34 and configured to control the functions associated with the radio transceiver 36 and the modem 30. The processor can include one or more of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, and/or a combination thereof.

Alternatively to communicating with a local data manager 22, some embodiments can provide the parking meter 10 with a radio interface 12 that communicates with the central data manager 26 rather than through a local data manager. In these embodiments, the radio transceiver 12 can comprise a cellular telephone transceiver, a MAN transceiver, a satellite transceiver, or other type of transceiver that communicates over a network to the central data manager 26 without using an intermediary (local) data manager.

The central data manager 26 has a controller 40 with a modem and a database store 42. It also has a communication module for communicating with financial institutions (not shown) to obtain authorization for credit or debit card payments and payment. The modem of the central data manager 26 can be any modem configured to communicate over a network such as the Internet. In one embodiment, the data store 42 includes a database that stores tag IDs and/or parking sensor IDs and associates the IDs with the unique physical locations and the removable meter unit IDs in order to store the payment collection histories as discussed above.

In a typical implementation, the transceivers 12 of the removable meter units 6 and the transceivers 36 of the local data mangers 22 have a power rating of about 1 mW and have a useful range of about 80 meters. Thus, each local group 24 can extend over an area having a radius of approximately 80 meters. Such a configuration is easily achievable with currently available technology. Alternative configurations may be suitable with other operating ranges and technologies.

In use, if a person wishing to park at a space associated with a parking meter as described herein wants to pay for parking time by means of a credit card or debit card or other payment token, the relevant information is read by a reader of the parking meter and is transmitted to the central data manager 26 via the relevant local data manager 22. The central data manager 26 obtains authorization and communicates the authorization back to the appropriate parking meter 10 via the relevant local data manager 22. Status reports, fault reporting, and/or configuration and software updates, may be communicated between the parking meters 10, the local data manager 22, and/or the central data manager 26.

In one embodiment where the parking meter 10-4 communicates with one or more other intermediate parking meters 10-5, and the intermediate parking meter 10-5 in turn communicates with the local data manger 22, the parking meters 10-4 and 10-5 communicate using a mesh network protocol. Mesh network protocols can be provided by several conventional protocols including Bluetooth, WiFi, and 802-15 (e.g., 802.15.4 commonly referred to as WPAN (Wireless Personal Area Network) including Dust, ArchRock, and ZigBee).

Figure 4:
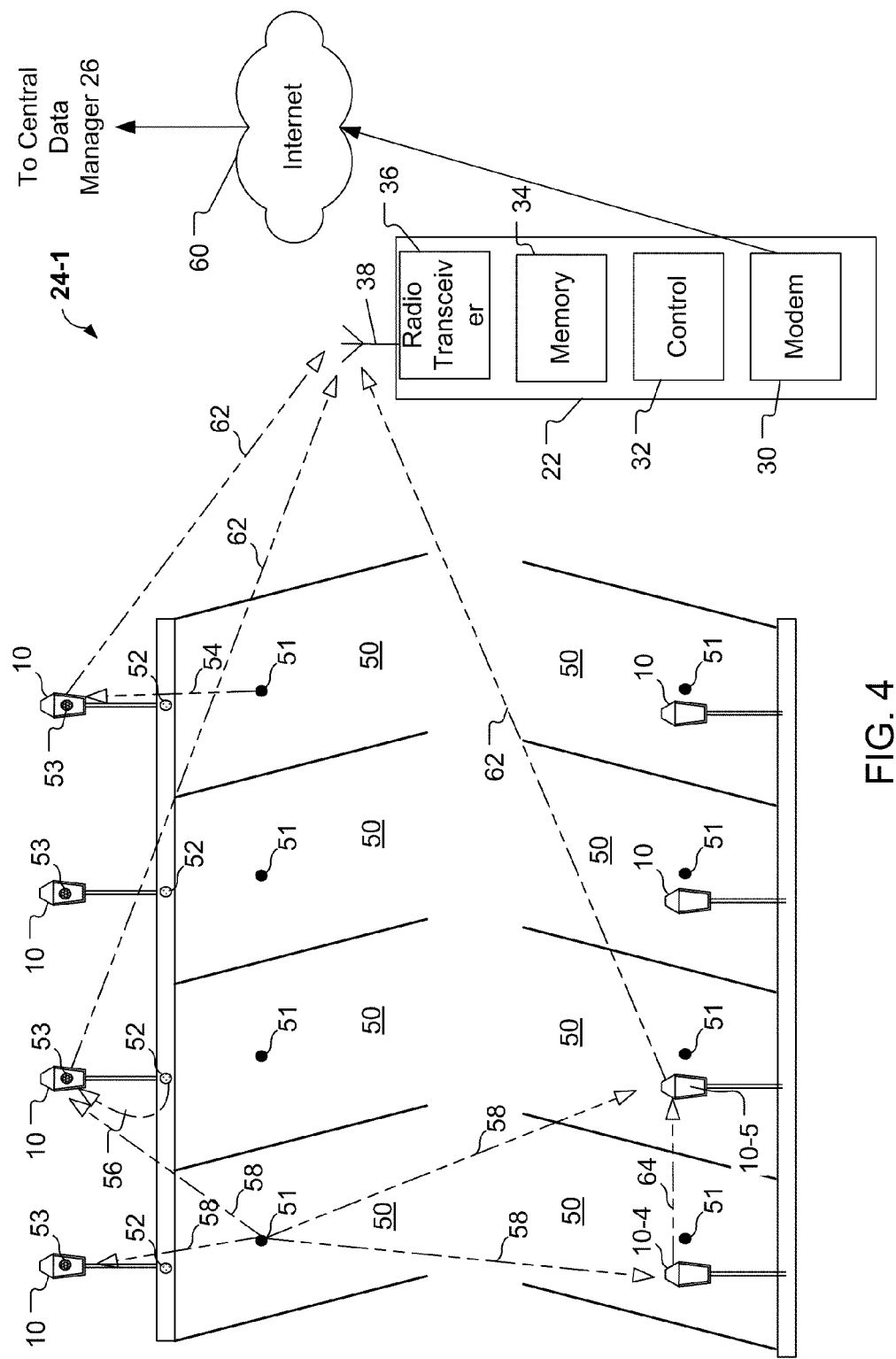
FIG. 4 shows an example of a local group of parking meters that can be monitored by the parking meter system of FIG. 3.

Referring to FIG. 4, an example of a local group 24-1 of parking meters 10 that can be monitored by the parking meter system 20 of FIG. 3 is shown. The local group 24-1 includes eight parking meters 10, but other numbers of parking meters 10 could be included in the local group 24-1. Each parking meter 10 is fixedly located at and associated with a parking space 50. The parking spaces 50 are angled parking spaces that could be located in a parking lot or on a street, for example. Other arrangements of parking spaces are suitable, such as parallel spaces, and will occur to those skilled in the art.

The parking meters 10 each include a removable meter unit 6, such as the removable meter units 6-1 and 6-2 illustrated in FIGS. 2A and 2B, that include a radio transceiver 12. The eight parking meters 10 communicate, via the radio transceiver 12, with the antenna 38 and the radio transceiver 36 of the local data manager 22. The parking meters 10 can communicate directly with the local data manager 22, as illustrated by connections 62, or indirectly (e.g., using a mesh network) via one of the other parking meters 10, as illustrated by connection 64 between parking meters 10-4 and 10-5. As discussed above, the removable meter units communicate information to the local data manager 22, the information including tag IDs, parking sensor IDs, removable meter unit IDs, payment collection information including currency received and credit/debit card information.

Each of the parking spaces 50 has an associated parking sensor that detects when a vehicle is parked in the parking space 50. Each of the parking spaces 50 in the local group 24-1 is shown with three parking sensors 51, 52, and 53. Typically, a single parking space 50 only has one parking sensor, it should be understood that the example shown in FIG. 4 shows three possible locations for purposes of illustration.

The parking sensors 51, 52, and 53 can be any of various sensors to detect occupancy (and vacating) of the physical location associated with the space 50, including magnetic field sensors, motion sensors, contact sensors, and the like. The parking sensors 51 and 52 are located away from the parking meters 10 whereas a sensor such as the parking sensor 53 is co-located with one of the parking meters 10. Preferably, each of the remote parking sensors 51 and 52 includes a short range wireless interface that is configured to communicate with the short range interface 11 of the parking meters 10, as illustrated by the connections 54 and 56 in FIG. 4. Alternatively, the remote parking sensors 51 and 52 could be connected via a wire to one of the parking meters 10. The co-located parking sensors 53 could be connected via a wired or wireless connection to the parking meter 10 with which each is co-located (e.g., using similar connections as the tag connection 37 discussed above).

The parking sensor 51 could be, for example a magnetic field sensor that is affected by the presence of a large metallic object such as a vehicle. The parking sensor 51 could also be a motion sensor that is triggered by motion of a vehicle or a contact sensor (including sensors such as an accelerometer or inclinometer) that is triggered by the weight of a vehicle. The location of the parking sensor 51 as depicted in FIG. 4 is only an example. Those skilled in the art will understand that other locations could also be suitable. The parking sensors 51 are sufficiently sensitive to detect a vehicle that is present in the parking space 50 with which the particular parking sensor 51 is uniquely associated, but are not so sensitive that they produce a "false positive" signal, such as if they mistakenly determine that a vehicle in a neighboring parking space is parked in the parking space 50 that is uniquely associated with the particular parking sensor 51 and parking meter 10.

The parking sensors 52 are located at the base of each parking meter 10. For example, a sensor 52 could be located at the bottom of the support pole 8 for a meter (see FIG. 1). This location has the advantage of being close to the parking meter 10, thereby affording a short transmission distance and low power consumption for communications. In addition, with a base location, the parking sensor 52 will not be blocked by the presence of a vehicle in the associated parking space, as would be the case if the parking sensor 51 were located in the middle of the parking space 50. The parking sensors 52 detect the presence of a vehicle in the associated space and can be sensors such as magnetic sensors, motion sensors, or contact sensors.

The co-located sensors 53 could also be magnetic sensors, motion sensors, or contact sensors. In the case of contact sensors, the parking sensor 53 could simply be a button that a person manually interacts with, thereby alerting the meter 10 that the associated parking space is occupied.

The remote parking sensors 51 and 52 can be powered by an internal battery. The typical transmission distances are relatively small, so the battery lifetime with currently available technology can be on the order of months or even years. Alternatively, the remote parking sensors 51 and 52 could be powered by the meter 10 (e.g., via battery or solar cell contained in the meter 10) if they are connected via a wire. The co-located parking sensor 53 can be powered by a power source at the meter 10 (e.g., a battery or solar cell).

In some embodiments, the vehicle sensors 51, 52 and 53 can sense an identifier associated with the vehicle that is parking at a meter 10. The vehicle identifier may be a license plate number that is optically detected. The vehicle identifier may be contained in an RFID tag, or other type of tag that can communicate with the sensor using NFC, that is attached to the vehicle. An RFID tag on the vehicle could be activated by any one of the sensors 51, 52 or 53 that is located on the meter, on the curb, or in the street in the parking space, respectively. The parking sensor 51, 52, or 53 can wirelessly communicate the vehicle identifier to the meter 10. The vehicle identifier may be stored at the data manager and linked with a user identifier (e.g., a RFID tag identification number), the credit/debit card, phone information and/or email information of the registered user.

Regardless of which type of sensors are used, the parking sensors 51, 52, 53 are configured to transmit an indication of an arrival event to one of the meters 10 that is uniquely associated with the parking space 50 where the parking sensor is located. In an alternative embodiment, the parking sensors 51, 52, 53 could transmit to any of the parking meters 10, as illustrated by the multicast connections 58. In this embodiment, the local group 24-1 could employ a mesh network protocol. In such a configuration, the parking meters 10 that receive the transmission from another sensor will forward the arrival event notification to the local data manager 22.

Each of the parking sensors 51, 52, 53 has an ID, e.g., a serial number, that is transmitted with the arrival event indication to the parking meters 10. The local data manager 22, or alternatively the central data manager 26, maintains a data base that associates the parking sensor IDs with tag IDs, meter IDs, and location information. This database is used to keep track of which locations are occupied and to keep track of the currency collected and handling credit or debit card transactions associated with each location (space).

In the embodiment shown in FIG. 4, the local data manager 22 uses the modem 30 to communicate with the central data manager 26 via the Internet 60. It should be understood that "modem" as used herein refers to any device that provides a communications interface between the local data manager and the network. The information communicated to the central data manager 26 includes tag IDs, removable meter unit IDs, arrival event indication reports, alerts regarding failure to receive payment subsequent to detecting an arrival event, and payment collection information including currency received and credit/debit card information.

Figure 5:
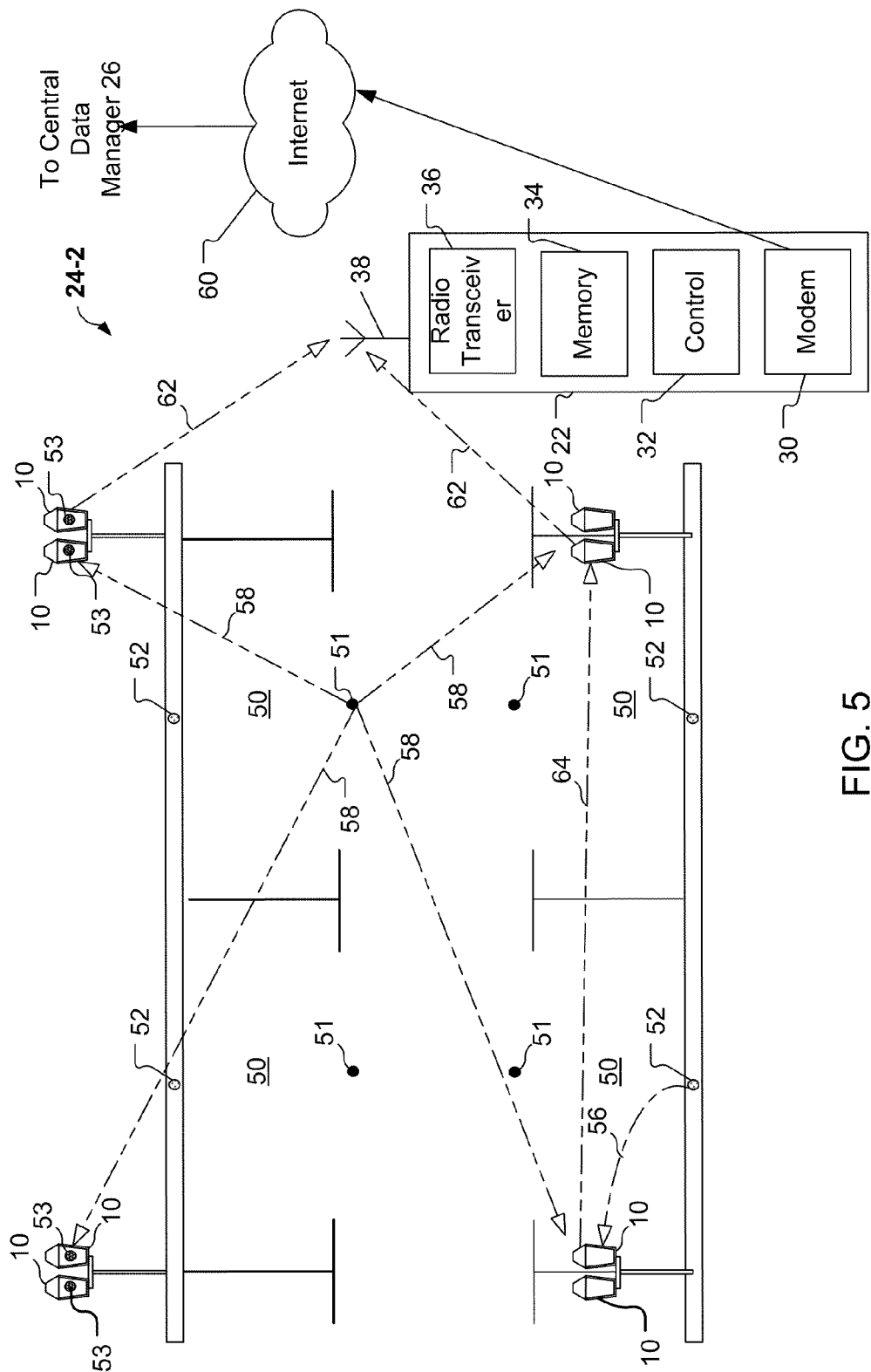
FIG. 5 shows another example of a local group of parking meters that can be monitored by the parking meter system of FIG. 3.

Referring to FIG. 5, another example of a local group 24-2 of parking meters 10 that can be monitored by the parking meter system 20 of FIG. 3 is shown. The local group 24-2 includes eight parking meters 10, but other numbers of parking meters 10 could be included in the local group 24-2. Each parking meter 10 is fixedly located at and associated with a parking space 50 (only four of the eight parking spaces 50 are shown). The parking spaces 50 are parallel parking spaces that can be located on a street, for example.

The parking meters 10 each include a removable meter unit 6, such as the removable meter units 6-1 and 6-2 illustrated in FIGS. 2A and 2B, that include a radio transceiver 12. The eight parking meters 10 communicate, via the network transceiver 12 with the antenna 38 and the radio transceiver 36 of the local data manager 22. The parking meters 10 can communicate directly with the local data manager 22, as illustrated by connections 62, or indirectly (e.g., using a mesh network) via one of the other parking meters 10, as illustrated by connection 64 between parking meters 10-4 and 10-5. As discussed above, the removable meter units communicate information to the local data manager 22 which then communicates the information to the central data manager 26, e.g. via the modem 30 and the Internet 60. The information communicated to the central data manager 26 includes tag IDs, removable meter unit IDs, arrival event indication reports, alerts regarding failure to receive payment subsequent to detecting an arrival event, and payment collection information including currency received and credit/debit card information.

The location of the parking sensors 51 in the local group 24-2 is illustrated as being in the street at the edge of the respective parking spaces 50. This sensor location ensures that the sensor transmission signals will not be blocked by a vehicle parked in the parking space 50. In one embodiment, the parking sensors 51-53 transmit to any of the parking meters 10 utilizing a mesh network protocol, as illustrated by the connections 58.

In one embodiment, the parking sensors 51, 52, 53 use shielding in order to detect an arrival event when a vehicle enters the associated parking space 50 and to avoid a false arrival event detection, e.g. due to vehicle traffic in the street or parking lot where the parking space 50 is located. The shielding can include physical shielding that prevents detection in one or more directions. For example, the parking sensors 51 in FIG. 5 could be shielded from detecting vehicles in the street. The shielding can also be implemented in software where signals emanating from one or more directions are not considered indicative of an arrival event.

Figure 6:
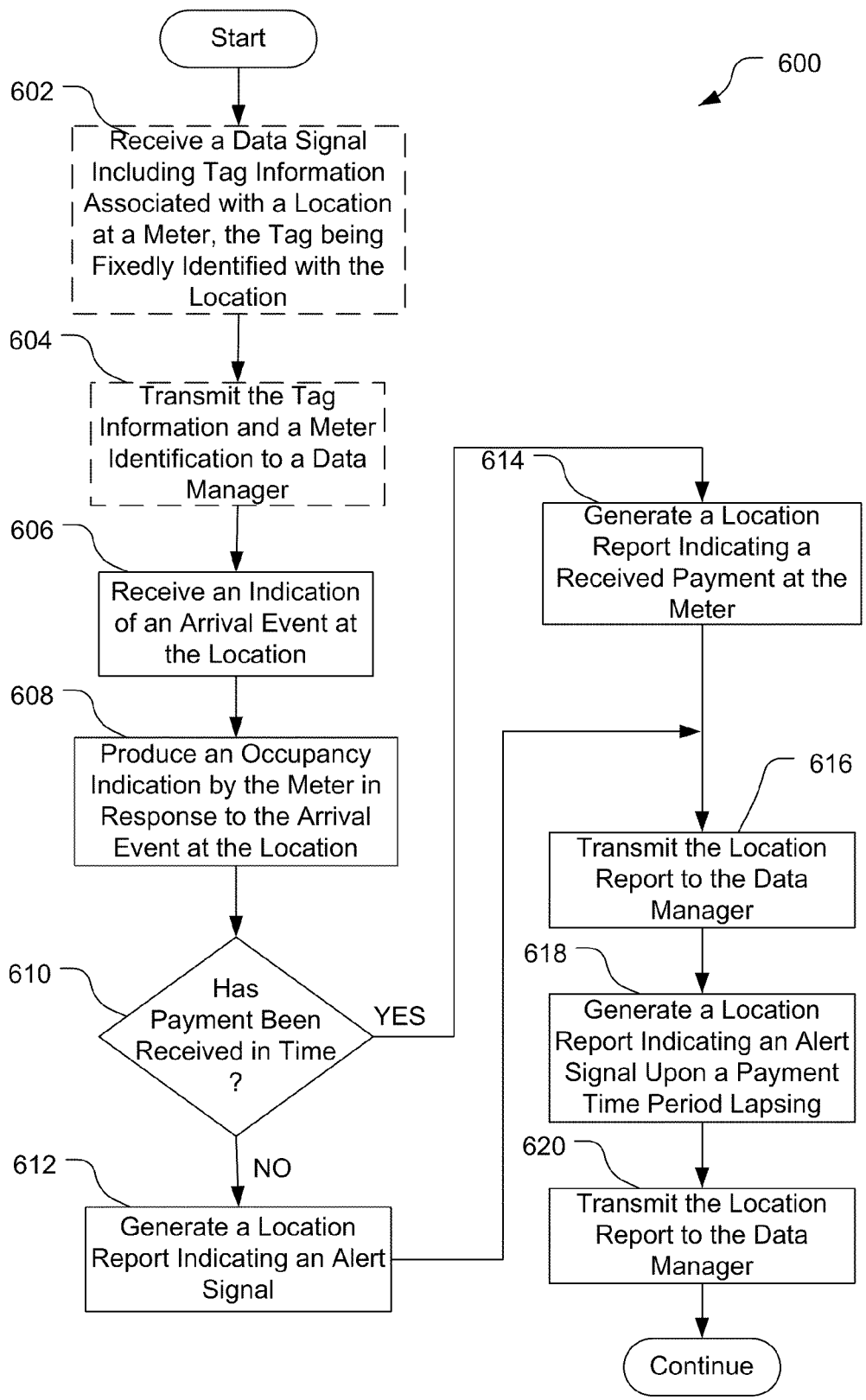
FIG. 6 shows a flowchart of an embodiment of a process for automatic location reporting performed by a meter such as the parking meters of FIGS. 1A, 1B and/or 1C in the system of FIG. 3.

Referring to FIG. 6, a flowchart of an embodiment of a process 600 for automatic location reporting performed by a meter such as the parking meters 10 of FIGS. 1A, 1B, and/or 1C in the system of FIG. 3 is illustrated. In one embodiment, where a removable meter unit 6 is contained in a housing 2 that includes a tag 3, e.g., the removable meter unit 6-2 and tag unit 3 illustrated in FIG. 2B, the process 600 starts at block 602 where the short range interface 11 of the meter unit 6-2 receives a data signal including tag information from the tag 3. The tag information includes a tag ID that is uniquely identified with the location where the tag is permanently attached.

Upon receiving the tag information at the block 602, the process 600 continues at block 604 where the radio transceiver 12 transmits the tag information and a meter ID to the a data manager such as the local data manager 22 or the central data manager 26. The data manager can then associate the meter ID with the tag ID which is associated with the location where the tag is fixedly located. The receiving and transmit steps 602 and 604 can be performed when the removable meter unit 6-2 is first inserted in the housing 2. The blocks 602 and 604 are optional in that they are omitted if the housing 2 does not contain a tag 3. The optional nature of these operations 602, 604 is indicated in FIG. 6 by dashed lines for these two blocks.

At block 606, the short range interface 11 receives an indication of an arrival event at the location, e.g., a parking space 50, that is associated with the parking meter. In one embodiment, the indication of the arrival event is a signal received from a parking sensor such as one of the parking sensors 51-53 illustrated in FIGS. 4 and 5. In another embodiment, the indication of the arrival event is a manually initiated interaction with the user interface 18 of the removable meter unit 6. For example, a person inserting a coin, bill or credit/debit card into the removable meter unit 6 or pushing a button of the user interface 18 thereby triggering the receipt of the indication of the arrival event at the block 606.

The arrival event can also be a vehicle leaving the parking space 10 at the location of the meter 10. Upon detecting that a vehicle has departed a parking space 50, the parking sensor transmits a data signal indicating that the parking space 50 is unoccupied. In one embodiment, the control module 16 of the meter 10 is configured to zero out the paid time period in response to receiving the data signal indicating that a vehicle has left leaving the parking space 50 unoccupied.

Upon receiving the indication of the arrival event at the block 606, the process 600 continues to block 608 where the meter produces an occupancy indication in response to the arrival event at the location with which the meter is associated. The occupancy indication can be a flashing light of the user interface 18. The occupancy indication could also be an alert signal transmitted to the data manager including an ID associated with the parking sensor and/or tag that is associated with the parking space at the location. In one embodiment, the color of the light is one color if the arrival event resulted from a vehicle entering the parking space 50 and another color if the arrival event resulted from a vehicle exiting the parking space 50.

The occupancy indication produced at the block 608 serves as a notification to external parties (e.g., data managers, parking attendants, the person that parked in the parking space 50, etc.) that a parking fee payment should be received imminently. The process 600 includes a decision block 610 where the control module 16 determines if a payment has been received within a time period after the arrival event indication signal was received at the block 610. The time period could be, for example, on the order of one to two minutes. If at the block 610 it is determined that a payment was not received within the time period, the process 600 continues to block 612 where the control module 16 generates a location report indicating an alert signal. The location report indicating the alert signal includes an alert notification and information associated with the location where the arrival event was detected. The information associated with the location is either the tag ID, if the meter 10 includes a tag 3, or the parking sensor ID or the meter ID.

If at the block 610 it is determined that a payment was received within the time period, the process 600 continues to block 614 where the control module 16 generates a location report indicating a received payment at the meter 10. The location report indicating the received payment can include an amount of currency received at the meter 10 or credit/debit card or payment token information. In addition, the location report indicating the received payment includes a tag ID, a parking sensor ID or a meter ID, any of which can be used to identify the location where the arrival event occurred.

Upon generating either of the location reports at the blocks 612 or 614, the process 600 continues to block 616 where the radio transceiver 12 transmits the location report to the data manager. The data manager can be either the local data manager 22 or the central data manager 26 or both, depending on the embodiment.

Upon receiving payment at the meter 10, a predetermined amount of parking time is provided. The parking time may be counted down locally at the meter and can be alternatively or additionally tracked at a local and/or central data manager. If the parking time lapses, the process 600 continues to block 618, where the control module 16 generates another location report indicating an alert signal. This location report and alert signal contains information indicating that the paid time period has lapsed and also contains a tag ID, a parking sensor ID, and/or a meter ID that can be used to identify the location where the lapsed time period occurred.

Upon generating the location report at the block 618, the process 600 continues to block 620, where the radio transceiver 12 transmits the location report to the data manager. Again, the data manager can be either the local data manager 22 or the central data manager 26 or both.

The functions at the blocks 602-620 of the process 600 continue as needed, depending on the events that occur (e.g., whether the removable meter unit 6 is replace, whether an arrival event occurs or whether alert events occur). It should be noted that the functions of the blocks 602 to 620 of the process 600 can be combined, rearranged or omitted. The operations depicted in FIG. 6 can be carried out by the control modules of the various devices described herein, in accordance with the description.

Figure 7:
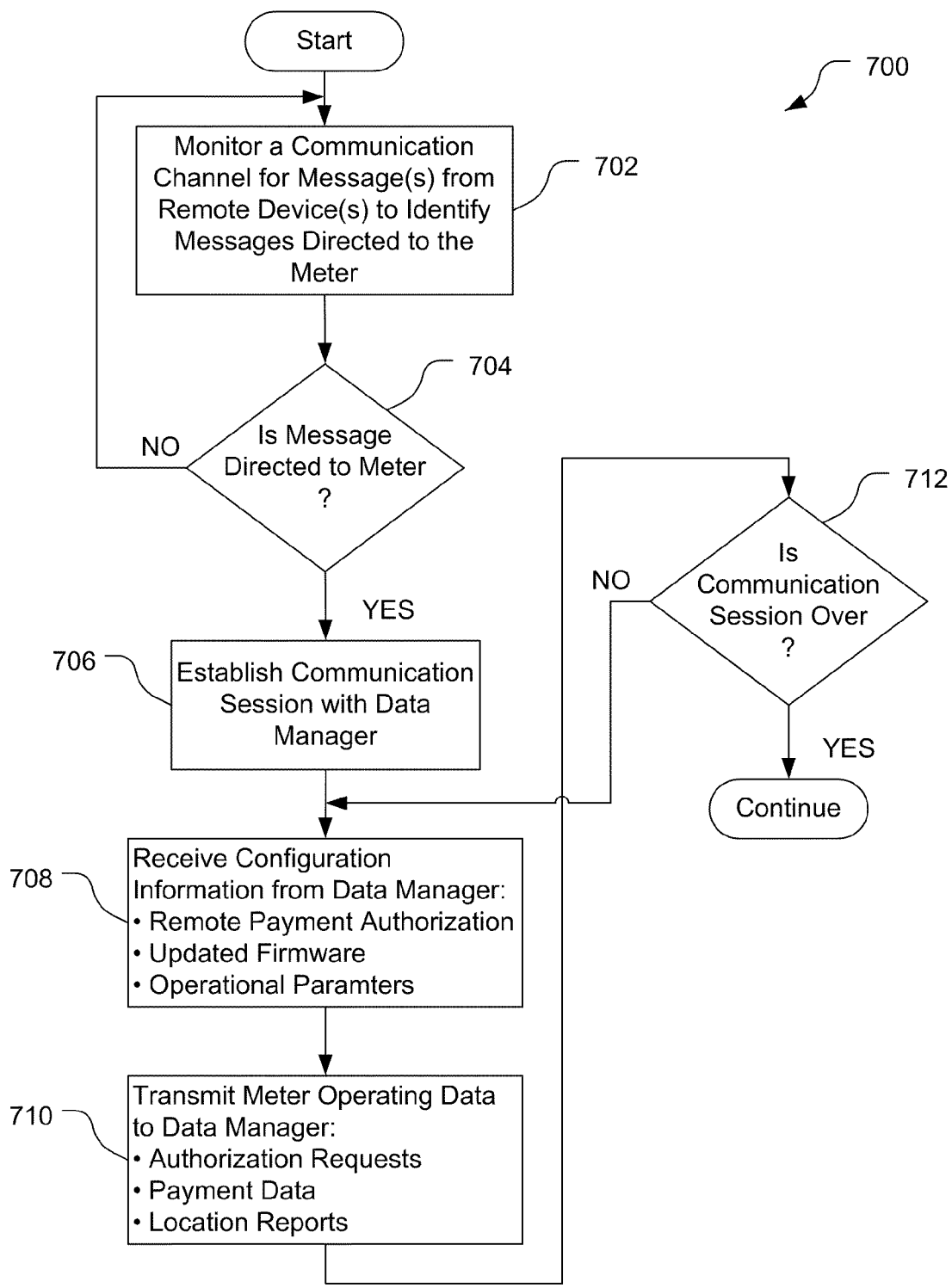
FIG. 7 shows a flowchart of an embodiment of a process of operating a meter to receive configuration updates and/or to report meter operating data.

Referring to FIG. 7, a flowchart of an embodiment of a process 700 for operating a meter such as the parking meters 10 of FIGS. 1A, 1B and/or 1C in the system of FIG. 3 is illustrated. The process 700 is an embodiment of a process of operating a meter 10 to receive configuration updates and/or to report meter operating data. Preferably, the meter 10 includes a radio transceiver 12 that is awake continuously to monitor for messages received from other meters 10 or the local data manager 22 of a local group 24. It is also preferable that the local group 24 utilizes a low power LAN. In this way, the meters 10 can continuously monitor for messages and not significantly deplete a self contained power source such as a battery with a solar cell backup. Higher power radio transceivers such as cellular transceivers wake up only occasionally to receive messages or wake up when a user interacts with the meter 10. By monitoring for messages continuously, the meter 10 can be assured of receive a message that is initiating a communication session such as a configuration update or a parking arrival notification.

The process 700 starts at block 702 where the radio transceiver 12 monitors the LAN to identify a message directed to the meter 10. The message can be from another meter 10 or from the data manager 22. The message is an initial message in a communication session. As used herein, a communication session is a finite series of messages that are performed to complete a task. The messages of a communication session are exchanged between the meter 10 and one or more other remote devices, e.g., the data manager 22, a parking sensor and/or another meter 10. The task associated with a communication session can be, for example, updating operational parameters of the meter 10, updating firmware of the meter 10, reporting an arrival event (see process 600 in FIG. 6) or performing a remote payment authorization for a non-cash payment (e.g., a payment authorization that was processed remote to the meter 10 in response to a payment authorization request initiated by another remote device such as a cell phone using a credit card, smart card and/or debit card). The initial message identified at block 702 includes information indicating what the task associated with the communication session entails. In some embodiments, the initial message also includes other information related to the task such as, for example, operational parameters (e.g., a parking rate, a geographic location, parking rules, an amount of currency in a cash box or times when parking rates or rules apply), firmware, parking sensor identification, remote payment authorization information, etc.

Not all messages that the meter 10 identifies at block 702 are directed to the meter 10 that is performing the process 700. The messages received at block 702 can be directed to other meters 10 or to the data manager 22. The messages identified at block 702 include an addressee field that indicates the meter 10 or data manager to which the message is directed. In a mesh network, the messages received at a meter that are directed to other meters 10 or the data manager 22 can be forwarded on by the meter 10 performing the process 700. As described below, such forwarding operations can be included in the "NO" outcome processing of the decision box 704.

Upon identifying a message at block 702, the process 700 continues to block 704, where the control module 16 determines if the addressee of the message is the meter 10 performing the process 700. If it is determined that the message is not directed to the meter 10 performing the process 700, the process 700 returns to block 702 (with optional forwarding operation). If it is determined the message is directed to the meter 10 performing the process 700, the process 700 continues to block 706 where the radio transceiver 12 establishes the communication session with the data manager 22. Establishing the communication session at block 706 includes transmitting an acknowledgement message to the data manager 22. The acknowledgement message contains information identifying the initial message (e.g., a message serial number) that was received at the block 702. The acknowledgement message can also include other information relevant to the task associated with the communication session.

Upon establishing the communication session at block 706, the process continues to block 708, where the radio transceiver 12 receives configuration information from the data manager 22. The configuration information is associated with the operation of the meter 10. The configuration information is also uniquely associated with the location of the meter 10. The type of configuration information received at the block 708 depends on the task being performed in the communication session. For example, in the case of a remote payment authorization, the received configuration information includes an amount of time for which payment has been authorized and which will be displayed on the user interface 18 of the meter. In the case of a firmware and/or operating software update, the configuration information includes the updated firmware and/or operating software to be stored in a memory of the meter 10. In the case of updated operational parameters, the configuration information may include operating parameters such as, for example, a parking rate for the meter 10, a geographic location, parking rules such as maximum terms or meter resetting rules, an amount of currency in a cash box of the meter, and times when different parking rates or rules apply. As with other configuration information, the operating parameters received at block 708 are stored in memory of the meter 10. Additionally, the configuration information can include information used to change the display information on the display of the meter 10, information used to change the way lights (e.g., expiration indicating lights) operate, and updated coin validation criteria (e.g., criteria that allows acceptance of new coins or tokens or modifies validation algorithms to identify invalid coins or slugs known to cause problems).

At block 710, the radio transceiver 12 transmits meter operating data to the data manager 22. The type of meter operating data transmitted at block 710 depends on the task being performed in the communication session. The transmitted meter operating data can include a payment authorization request, a report of payment received at the meter, location reports as discussed in reference to FIG. 6, or tag information. The meter operating data can also include an acknowledgement that the meter 10 received the configuration information at block 708.

At block 712, the control module 16 determines if the communication session is over, or completed. The communication session is over when the task associated with the communication session is completed. If it is determined that the communication session is over, the functions at the blocks 702-712 of the process 700 continue as needed, depending on the events that occur (e.g., whether an initial message directed to the meter 10 is received at block 702). If it is determined at block 712 that the communication session is not over, the process 700 returns to perform the functions at blocks 708-712 until the communication session is completed. It should be noted that the functions of the blocks 702-712 of the process 700 can be combined, rearranged or omitted. The operations depicted in FIG. 7 can be carried out by the control modules of the various devices described herein, in accordance with the description.

Figure 8:
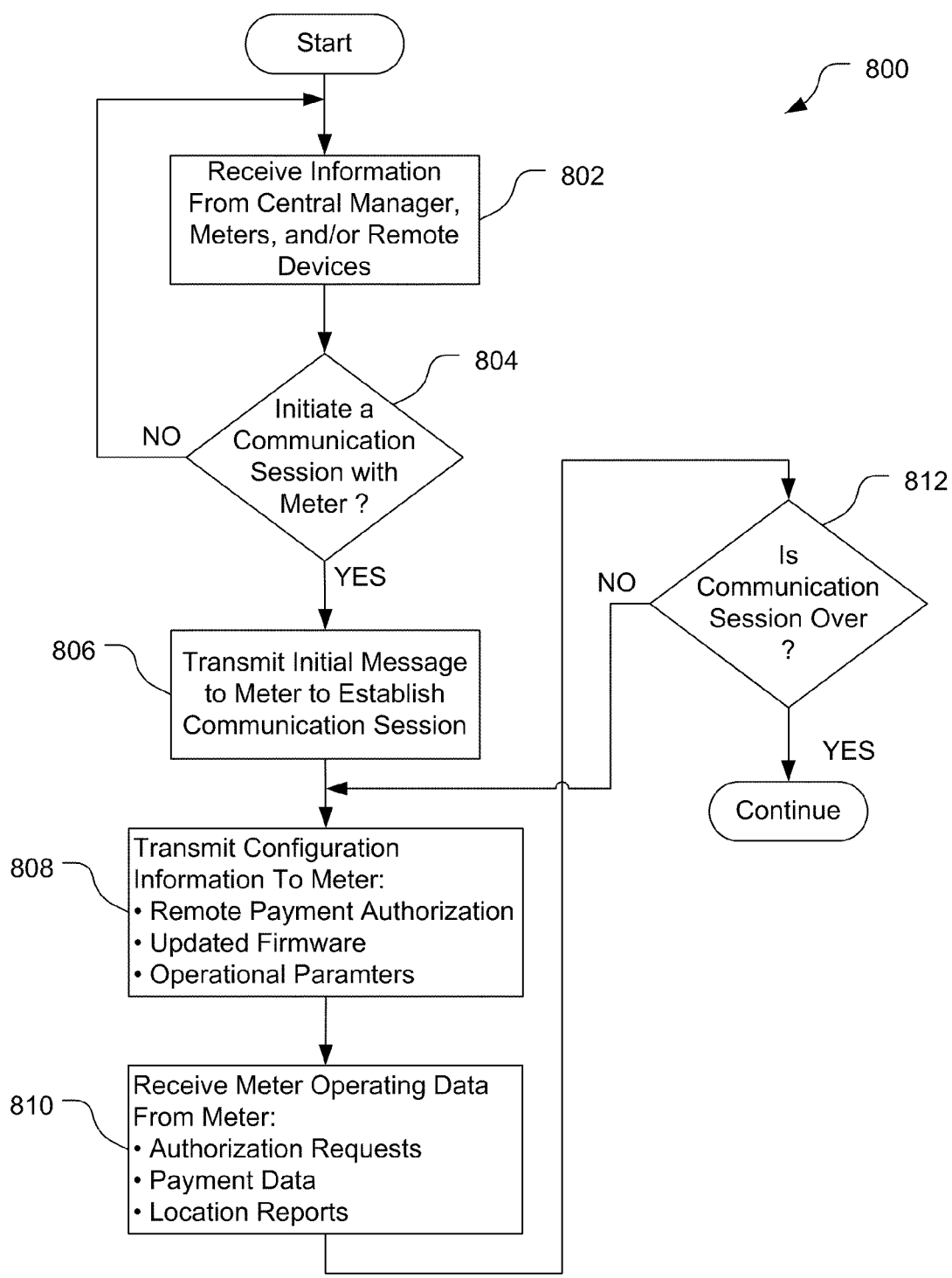
FIG. 8 shows a flowchart of an embodiment of a process for operating a data manager to initiate configuration updates with a meter.

Referring to FIG. 8, a flowchart of an embodiment of a process 800 for operating a meter such as the parking meters 10 of FIGS. 1A, 1B and/or 1C in the system of FIG. 3 is illustrated. The process 800 is an embodiment of a process performed by the data manager 22 for purposes of causing a meter 10 to receive configuration updates and/or receive meter operating data from the meter 10. Similarly to the process 700, it is preferable that the meter 10 includes a radio transceiver 12 that is awake continuously to monitor for messages received from other meters 10 or the local data manager 22 of a local group 24. It is also preferable that the local group 24 utilizes a low power LAN.

The process 800 starts at block 802 where the radio transceiver 36 or the modem 30 receives information from the central manager 26, one of the meters 10 and/or from a remote device such as a cell phone. The information received at the block 802 can be an authorization of payment that was processed remotely from the meters 10, updated firmware for one of the meters 10 or updated operational parameters for one of the meters 10.

Upon receiving the information at block 802, the process 800 continues at block 804, where the control module 32 determines if a communication session with one of the meters 10 should be initiated. If it is determined that a communication session is not needed, the process 800 returns to block 802. If it is determined that a communication session is needed, the process 800 continues to block 806, where the radio transceiver 36 transmits an initial message of the communication session toward one or more of the meters 10. The initial message transmitted at block 806 includes information indicating what the task associated with the communication session entails. In some embodiments, the initial message also includes other information related to the task such as, for example, operational parameters (e.g., a parking rate, a geographic location, parking rules, an amount of currency in a cash box or times when parking rates or rules apply), firmware, parking sensor identification, remote payment authorization information, and the like. Thus, changes in any of these values can be efficiently communicated to the parking meters. The initial message transmitted at block 806 also includes an addressee field that indicates the meter(s) 10 to which the initial message is directed. In a mesh network, the initial message can be received by any of the meters 10, and the meter 10 that receives the message can forward the message to the meter 10 to which the initial message is directed.

The communication session is established at block 806 when the meter 10 to which the initial message was directed responds with an acknowledgement message. Upon the communication session being established, the process 800 continues at block 808, where the radio transceiver 36 transmits configuration information to the meter 10. The configuration information is associated with the operation of the meter 10. The configuration information is also uniquely associated with the location of the meter 10. The configuration information can include any of the types of configuration information discussed above in reference to block 708 of FIG. 7.

At block 810, the radio transceiver 36 receives meter operating data from the meter 10. The type of meter operating data transmitted at block 810 depends on the task being performed in the communication session. The meter operating data can include a payment authorization request, a report of payment received at the meter, location reports as discussed in reference to FIG. 6 or tag information. The meter operating data can also include an acknowledgement that the meter 10 received the configuration information at block 808.

At block 812, the control module 32 determines if the communication session is over. The communication session is over when the task associated with the communication session is completed. If it is determined that the communication session is over, the functions at the blocks 802-812 of the process 800 continue as needed, depending on the events that occur. If it is determined at block 812 that the communication session is not completed, the process 800 returns to perform the functions at blocks 808-812 until the communication session is completed. It should be noted that the functions of the blocks 802-812 of the process 800 can be combined, rearranged or omitted. The operations depicted in FIG. 8 can be carried out by the control modules of the various devices described herein, in accordance with the description.

Figure 9:
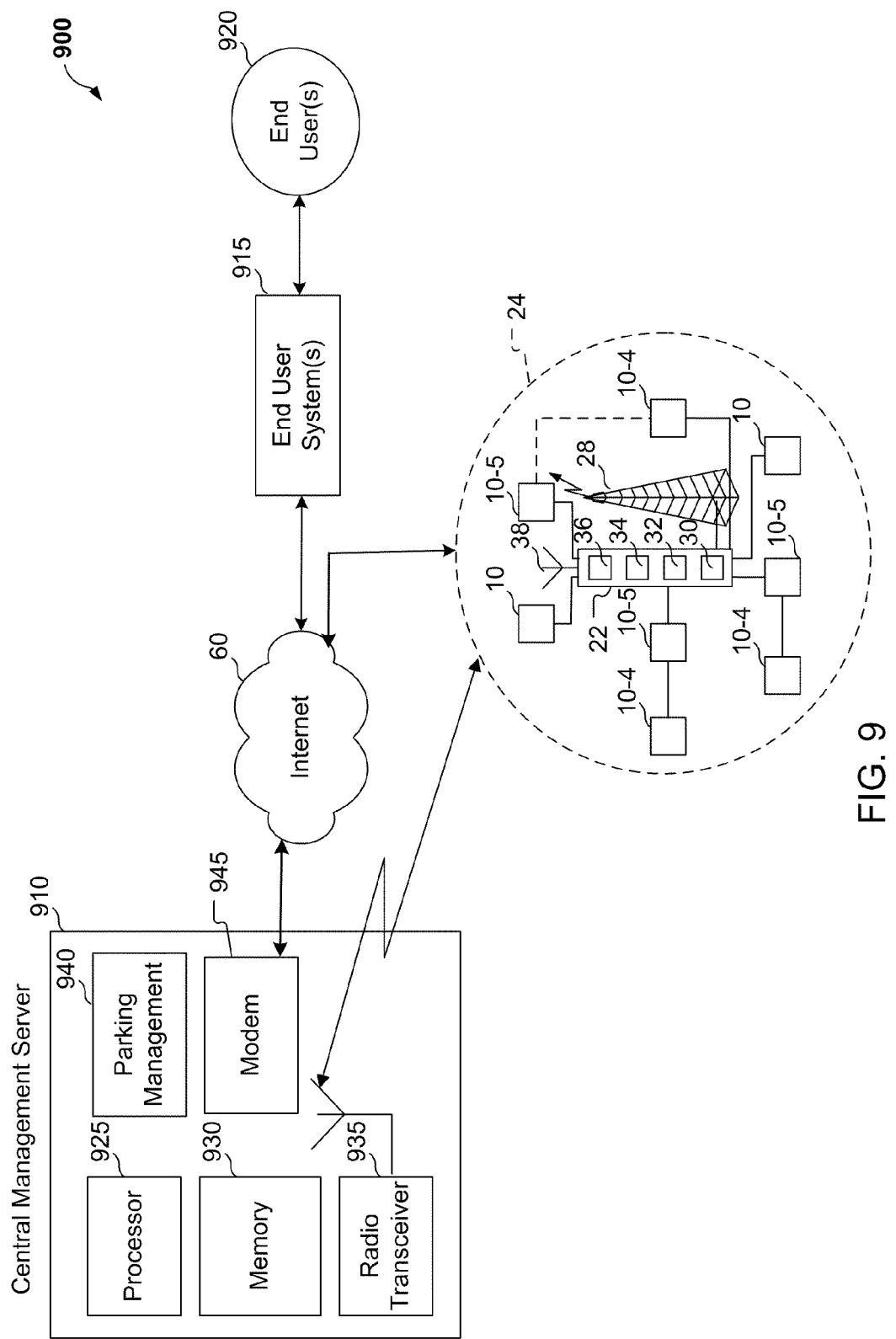
FIG. 9 shows schematically a parking meter management system for monitoring and updating a parking meter system.

Referring to FIG. 9, a parking meter management system 900 for monitoring and updating a parking meter system includes a central management server 910. The central management server 910 can be located at the central data manager 26 illustrated in FIG. 3. The central management server 910 includes a processor 925, memory 930, a radio transceiver 935, a parking management module 940 and a modem 945. The central management server 910 executes software programming that provides the functionality described herein to perform the parking meter management tasks for reporting and maintenance. The parking management module 940 provides an interactive system that allows an end user 920 having an end user system 915 (e.g., a personal computer, a PDA, a smart phone, etc.) to program a set of parking meters. The end user system 915 connects to the parking management server 910 via the internet, for example.

The parking management system 900 also includes one or more local groups 24 that include a local data manager 24 and multiple meters 10. The radio transceiver 935 and/or the modem 945 communicates with the local data manager 22 either directly, or via the base station 28. Alternatively, the radio transceiver 935 can communicate directly with the meters 10. The radio transceiver 935 and/or the modem 945 is used to transmit information to the local group 24 and receive information from the local group 24.

The end user 920 interacts with the central management server 910 via a network such as the Internet 60 to program and/or monitor the meters 10 of the local group 24 using the interactive system provided by the parking management module 940. The parking management module 940 communicates information to and from the local group 24 via the radio transceiver 935 and/or the modem 945. The radio transceiver 935 can comprise a cellular telephone transceiver, a MAN transceiver, a satellite transceiver, or other type of transceiver that communicates over a wireless network to the local data manager 22. The modem 945 can also communicate via the Internet 60 to the local data manager 22.

The parking management module 940 presents the end user 920 with a set of web pages or user interface screens that the end user navigates through in order to monitor and program the meters 10 and/or the data manager 22 of the local group 24. The end user 920 can be a city employee, for example. Interacting with the user interface screens of the parking management module 940, the end user 920 can monitor the currency collected, credit card transactions, status of the meters 10, occupancy states of the parking spots, etc. In addition, the end user 920 can change the configuration of the meters 10 either individually or as a group.

As noted above, the central management server 910 can include a processor 925 and memory 930. The parking management module 940 can be provided as software programming that is executed by the processor to perform the data management and maintenance operations described herein. A user of the central management server can provide input via user input devices such as keyboards and computer mice and can receive output such as systems messages and reports via user output devices such as displays and the like. Additional details of the central management server 910 are described below.

Figure 10A:
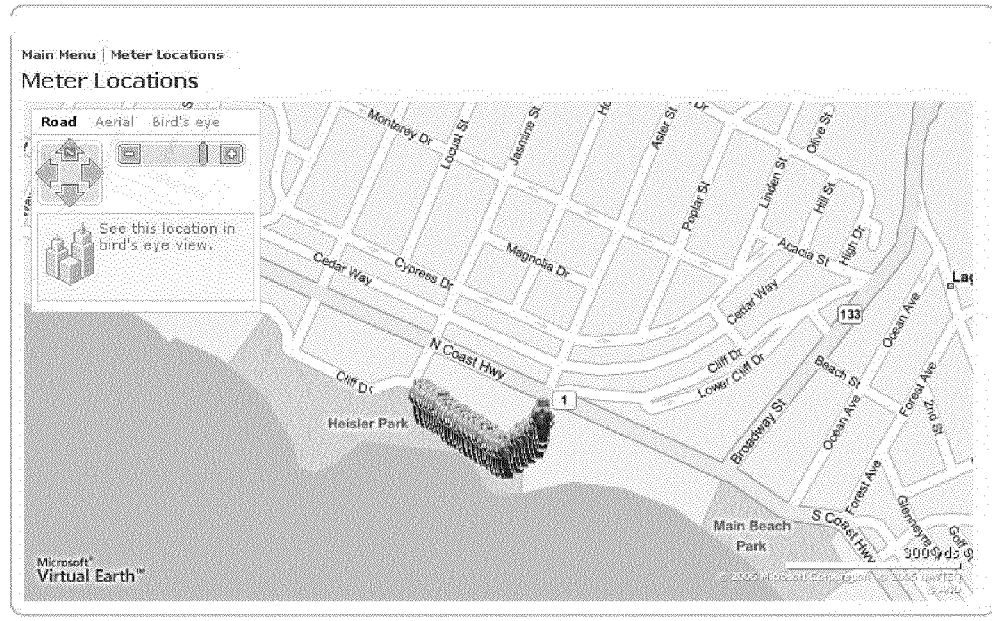
FIGS. 10A and 10B show examples of user interface screens regarding meter locations generated by the parking meter management system of FIG. 9.
Figure 10B:
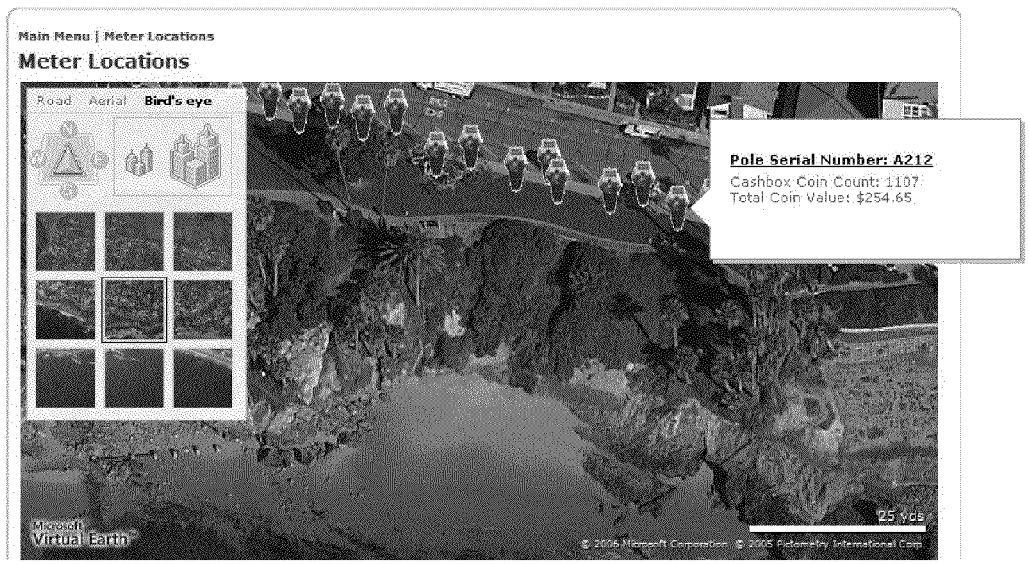

FIGS. 10A and 10B show examples of user interface screens regarding meter locations generated by the parking management system 900 of FIG. 9. The user interface screens can be displayed, for example, on user output devices of the central management server 910. FIG. 10A is a road map view showing locations of parking meters. FIG. 10B is a "bird's eye view" from a satellite photograph. The meters are illustrated at their actual geographic locations by icons. The end user 920 can position the computer mouse cursor over one of the icons and obtain information regarding the status of the individual meter 10. For example, the amount of money collected in the cash box can be displayed.

FIGS. 11A and 11B show examples of user interface screens regarding financial data generated by the parking management system 900 of FIG. 9. The user interface screens can be displayed, for example, on user output devices of the central management server. The screen illustrated in FIG. 11A shows monthly statistics for a group of meters, e.g., a local group 24. The financial data presented to the end user 920 includes cash amounts, credit amounts, total revenue, number of transactions as well as statistical data including cash per meter (pole), credit per meter, etc. FIG. 11B shows a summary of cash and credit collected for all the meters of a geographic area. The area that FIG. 11B represents can be various levels, such as city level, street level, zip code, etc.

FIG. 12 shows an example of a user interface screen regarding credit card transactions generated by the parking management system 900 of FIG. 9. The information in FIG. 12 includes transaction date, transaction reference number, machine reference, last four digits of a credit card, card scheme and transaction amount.

Figures 13B, 14:

FIGS. 13A and 13B show examples of user interface screens regarding coin collection data generated by the parking meter management system 900 of FIG. 9. The information in these screens include the number of each type of coin collected and the total amount of currency collected for each meter. In this way, the end user 920 can keep track of how much money should be collected when the cash box of a given meter is collected. When coins are collected from a meter 10, the person collecting the currency inserts an identification card into the meter 10 to signal to the meter 10 that the cash box is being emptied. The meter 10 then resets the coin count to zero and transmits the coin collection information back to the central management server 910.

FIG. 14 shows an example of a user interface screen regarding battery voltage data generated by the parking meter management system 900 of FIG. 9. The voltage level is used to indicate the health of the battery. When a voltage level falls below a healthy (operational) threshold level, the voltage is displayed in red in order to alert the end user 920 that a new battery should be installed at the meter 10.

Figures 15, 16A:
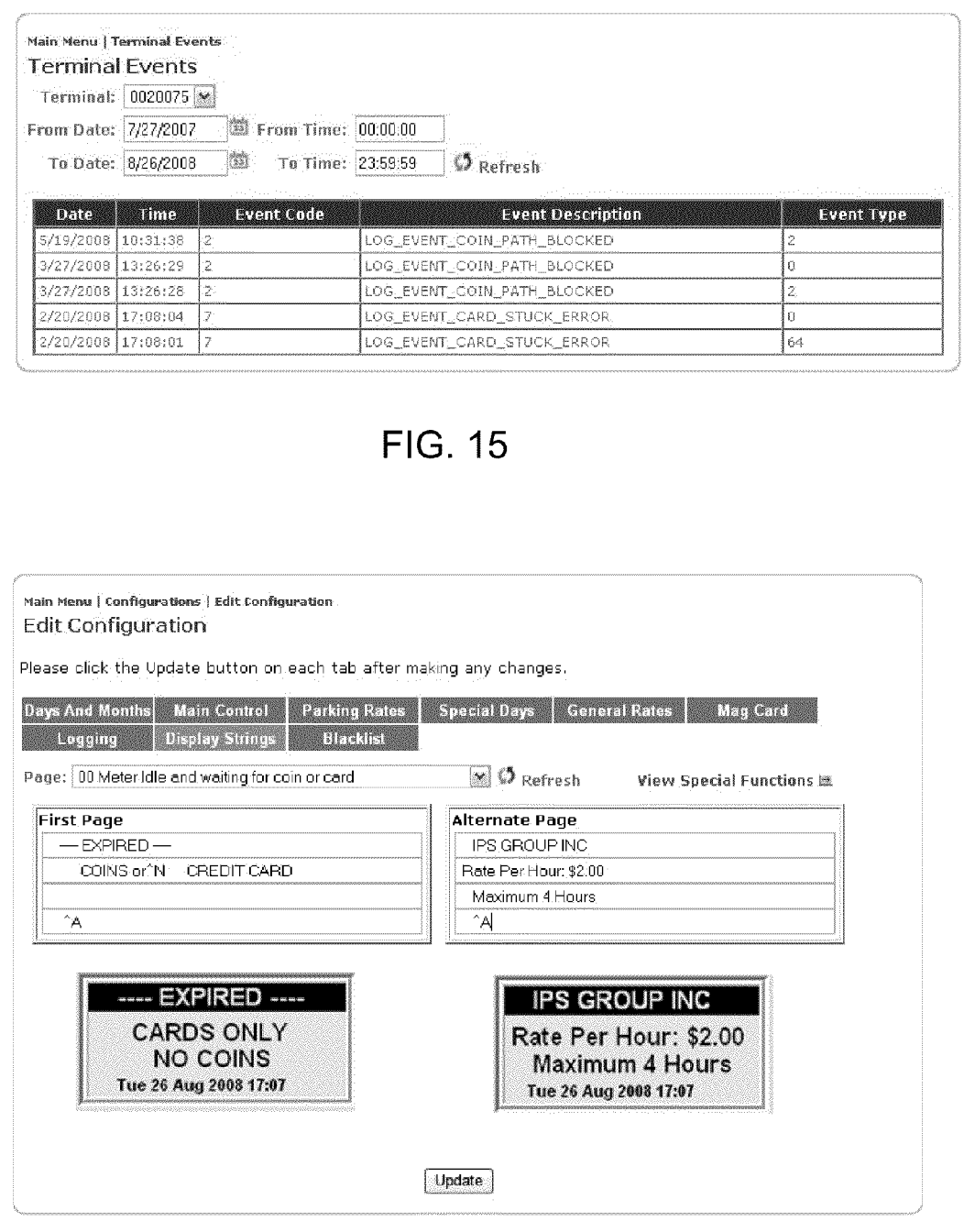

FIG. 15 shows an example of a user interface screen regarding terminal events at a meter 10 generated by the parking meter management system 900 of FIG. 9. Terminal events include fault states of the meter 10 including, for example, coin path blockages and jammed credit card readers. This information allows the end user to identify problem areas and alert law enforcement officers to better monitor the problem areas to reduce vandalism.

Figure 16B:
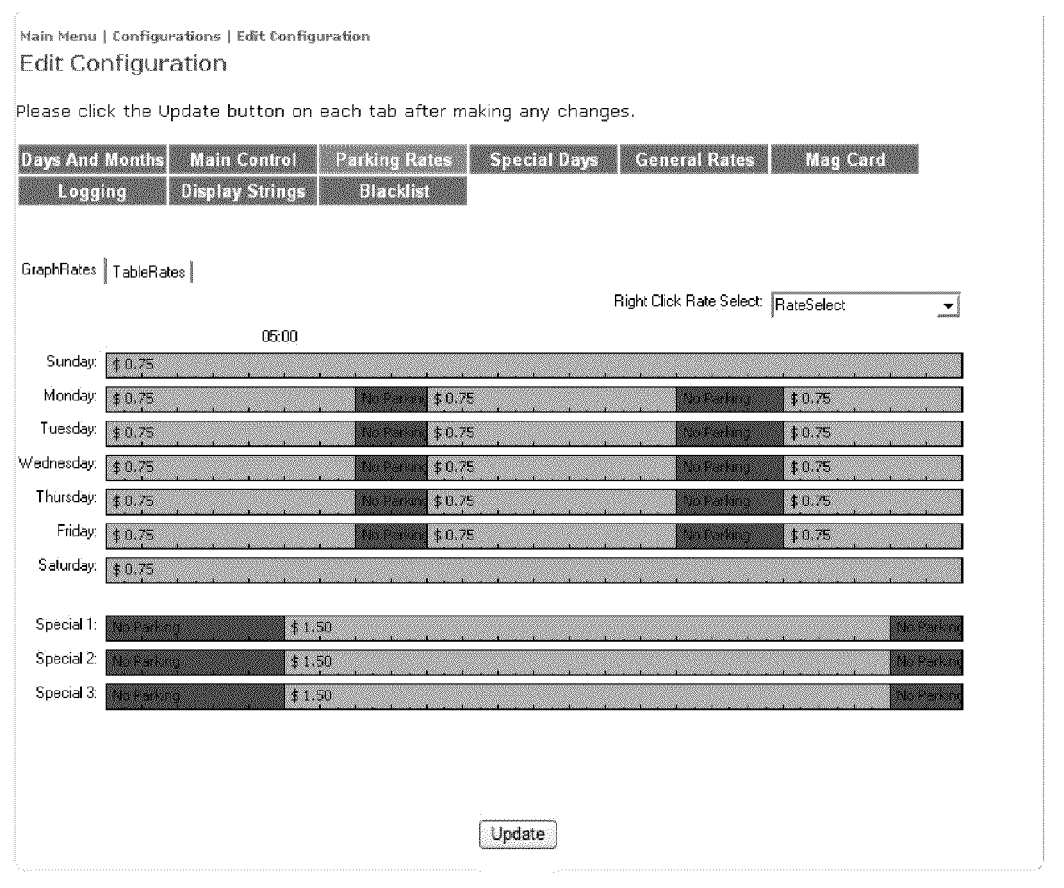
Figure 16C:
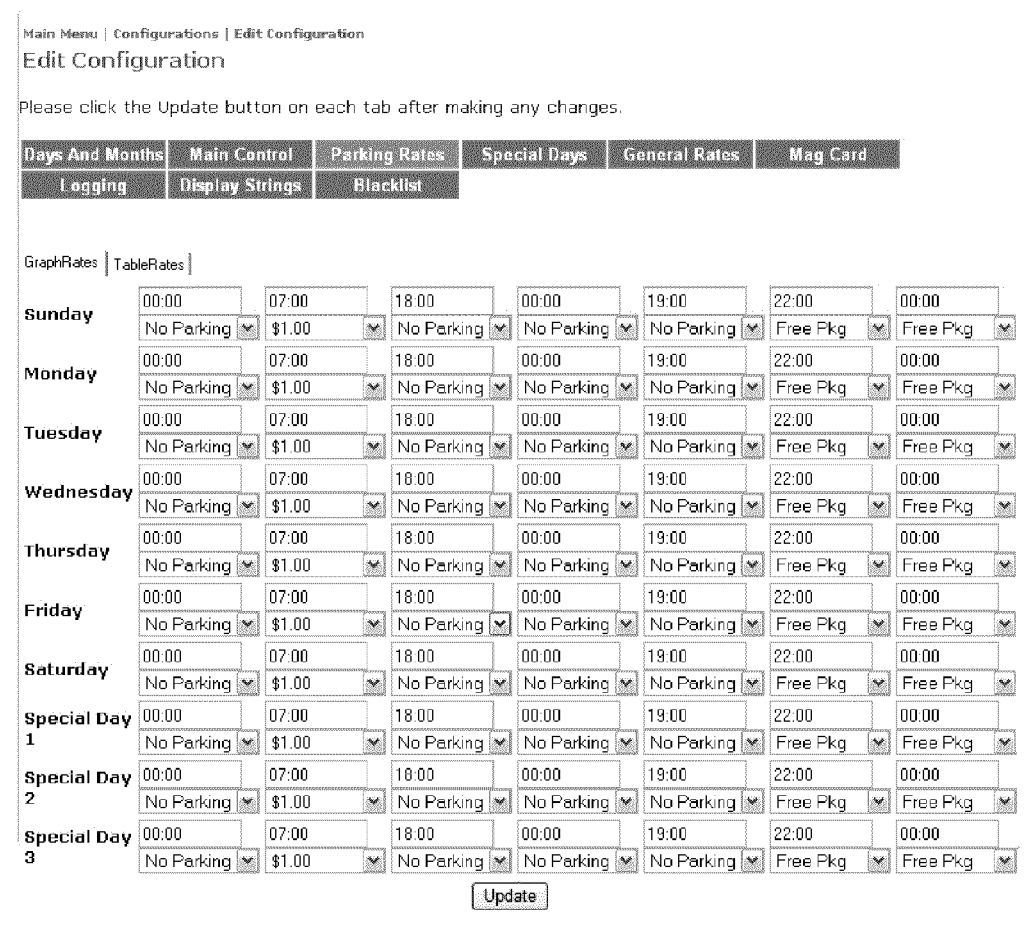

FIGS. 16A, 16B, and 16C show examples of user interface screens regarding meter configuration information generated by the parking meter management system 900 of FIG. 9. The end user 920 can program individual meters or groups of meters using the screens of FIGS. 16A, 16B, 16C. The configuration information includes parking rates, parking time limits, parking rules and meter display messages. The display messages include four lines of text to allow the end user 920 to cause the meter display to display any message such as, for example, No Parking, Tow Away, allowable parking times, and the like. The user interface screens illustrated above in FIGS. 10-16 can be displayed, for example, on user output devices of the central management server 910.

Figure 17:
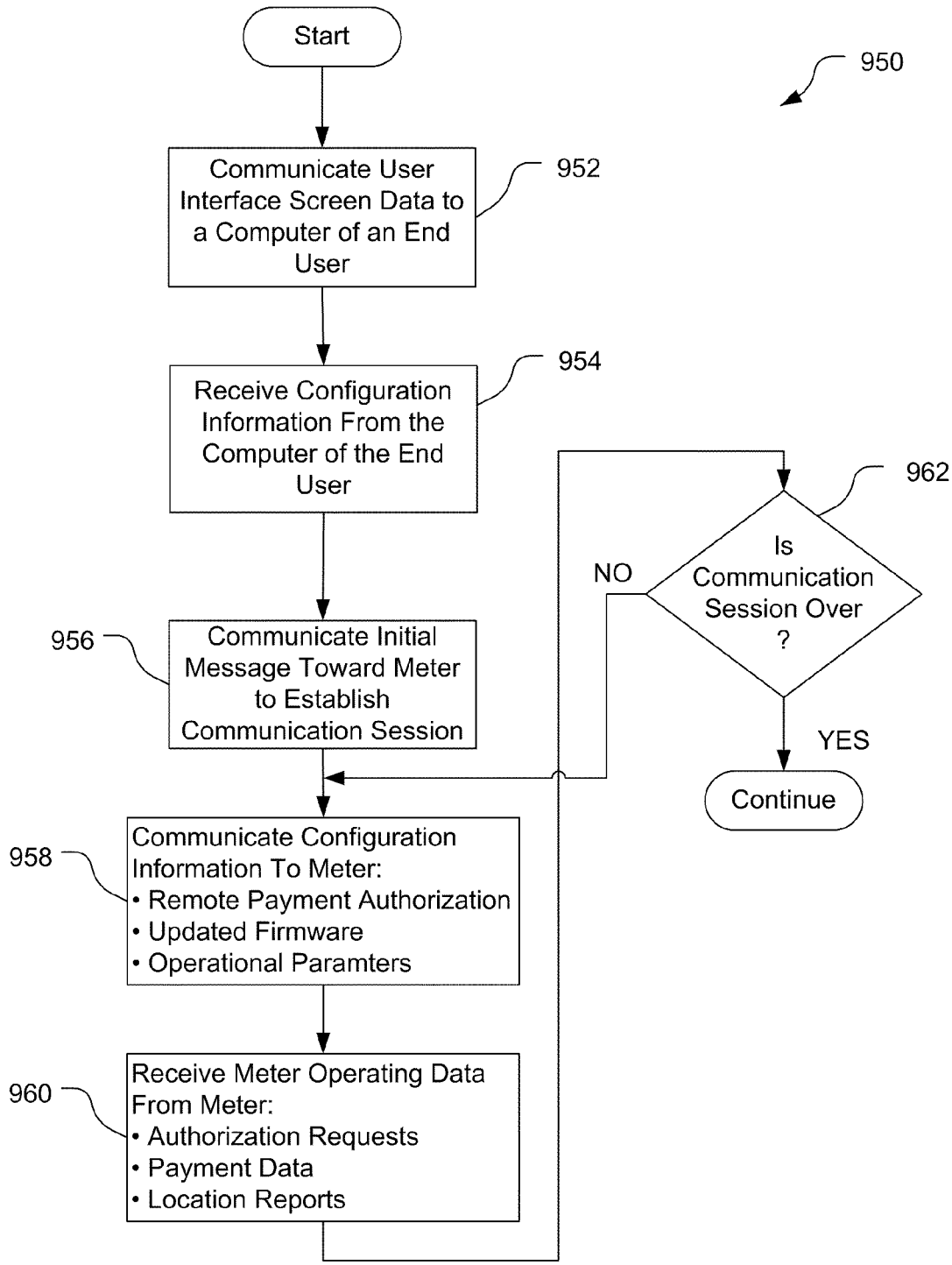
FIG. 17 is a flowchart of an embodiment of a process for operating a meter with the parking meter management system of FIG. 9.

Referring to FIG. 17, a flowchart of an embodiment of a process 950 for operating a meter with the parking meter management system 900 is illustrated. The process 950 is an embodiment of a process performed by the central management server 910 for enabling an end user 920 to reconfigure a meter 10 including providing updated configuration information and for retrieving meter operating data. Similarly to the processes 700 and 800, it is preferable that the meter 10 includes a radio transceiver 12 that is awake continuously to monitor for messages received from other meters 10 or the local data manager 22 of a local group 24. It is also preferable that the local group 24 utilizes a low power LAN.

The process 950 starts at block 952 where the radio transceiver 935 or the modem 945 communicates user interface screen data to a computer of the end user 920. The information communicated at the block 802 can comprise the information included in any of the screens illustrated in FIGS. 10-16.

Upon communicating the information at block 952, the process 950 continues at block 954, where the radio transceiver 935 or the modem 945 receive configuration information from the computer of the end user. The configuration information can include, for example, operational parameters (e.g., a parking rate, a geographic location, parking rules, an amount of currency in a cash box, or times when different parking rates or rules apply), firmware, parking sensor identification, remote payment authorization information, and the like.

The process 950 continues to block 956, where the radio transceiver 935 or the modem 945 communicates an initial message of the communication session toward one or more of the meters 10. The initial message transmitted at block 956 includes information indicating what the task associated with the communication session entails. In some embodiments, the initial message also includes other information related to the task such as, for example, operational parameters (e.g., a parking rate, a geographic location, parking rules, an amount of currency in a cash box or times when parking rates or rules apply), firmware, parking sensor identification, remote payment authorization information, etc. The initial message transmitted at block 956 also includes an addressee field that indicates which meter(s) 10 the initial message is directed to.

Preferably, the initial message is communicated to the local data manger 22. In a mesh network, the initial message can be forwarded by the local data manager 22 and can be received at any one of the meters 10, whereupon the meter that receives the message can then forward the message to the meter to which the initial message is directed.

The communication session is established at block 956 when the meter 10 to which the initial message was directed responds with an acknowledgement message. Upon the communication session being established, the process 950 continues at block 958, where the radio transceiver 935 or the modem 945 communicates the configuration information toward the meter 10. The configuration information is associated with the operation of the meter 10. The configuration information is also uniquely associated with the location of the meter 10. The configuration information can include any of the types of configuration information discussed above in reference to block 708 of FIG. 7.

At block 960, the radio transceiver 935 or the modem 940 receives meter operating data from the meter 10. The type of meter operating data transmitted at block 810 depends on the task being performed in the communication session. The meter operating data can include a payment authorization request, a report of payment received at the meter, location reports as discussed in reference to FIG. 6 or tag information. The meter operating data can also include an acknowledgement that the meter 10 received the configuration information communicated at block 958. Preferably, the meter operating data is received from the local data manager 22. The radio transceiver 935 or the modem 945 can receive the meter operating data at block 960.

At block 962, the control module parking management module 940 determines if the communication session is over. The communication session is over when the task associated with the communication session is completed. If it is determined that the communication session is over, the functions at the blocks 952-962 of the process 950 continue as needed, depending on the events that occur. If it is determined at block 962 that the communication session is not completed, the process 950 returns to perform the functions at blocks 958-962 until the communication session is completed. It should be noted that the functions of the blocks 952-962 of the process 950 can be combined, rearranged or omitted. The operations depicted in FIG. 17 can be carried out by the processor of the central management server 910.

Figure 18:
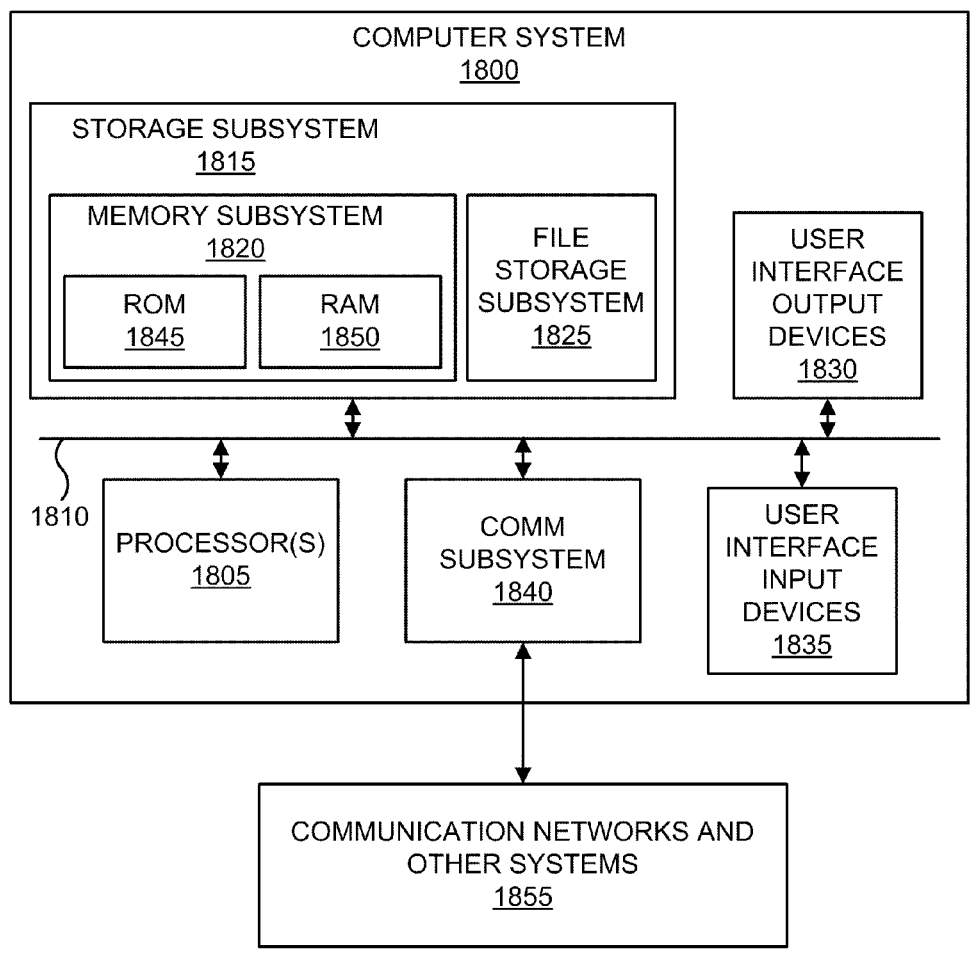
FIG. 18 is a block diagram of a computer system that may incorporate embodiments of the disclosure for performing the operations described herein, including operations of the parking meter management system of FIG. 9.

FIG. 18 is a block diagram of a computer system 1800 that may incorporate embodiments in accordance with the disclosure for performing the operations described herein, including operations of the parking meter management system 900 and the central management server 910. In the present embodiment, the computer system 1800 typically includes one or more processors 1805, a system bus 1810, storage subsystem 1815 that includes memory subsystem 1820 and file storage subsystem 1825, user interface output devices 1830, user interface input devices 1835, a communications subsystem 1840, and the like.

In various embodiments, the computer system 1800 typically includes conventional computer components such as the one or more processors 1805, and memory storage devices such as a read only memory (ROM) 1845 and random access memory (RAM) 1850 in the memory subsystem 1820, and disk drives in the file storage subsystem 1825.

In the illustrated embodiment, the user interface output devices 1830 can comprise a variety of devices including computer displays, viewing screens, indicator lights, loudspeakers, tactile output, and the like. The user interface input devices 1835 can comprise a variety of devices including a computer mouse, a trackball, a track pad, a joystick, wireless remote, drawing tablet, voice command system, eye tracking system, and the like. The user interface input devices 1835 typically allow a user to select objects, icons, text, and the like that appear on the user interface output devices 1830 via a command such as a click of a button or the like.

Embodiments of the communication subsystem 1840 typically include an Ethernet card, a modem (telephone, satellite, cable, ISDN), (asynchronous) digital subscriber line (DSL) unit, FireWire interface, USB interface, and the like. For example, the communications subsystem 1840 may be coupled to the communications networks and other systems 1855 (e.g., the Internet communications network 60 of FIGS. 4 and 5), to a FireWire bus, or the like. In other embodiments, the communications subsystem 1840 may be physically integrated on the motherboard of the computer system 1800, may be a software program, such as soft DSL, or the like.

The RAM 1850 and the file storage subsystem 1825 are examples of tangible media configured to store data such as payment collection, meter rates, including executable computer code, human readable code, or the like. Other types of tangible media include: floppy disks; removable hard disks; optical storage media such as CD-ROMS, DVDs, and bar code symbols; semiconductor memories such as flash memories, read-only-memories (ROMS); battery-backed volatile memories; networked storage devices; and the like.

In the present embodiment, the computer system 1800 may also include software that enables communications over a network (e.g., the communications network 60 of FIG. 4 and FIG. 5) such as the DNS, TCP/IP, UDP/IP, and HTTP/HTTPS protocols, and the like. In alternative embodiments of the present invention, other communications software and transfer protocols may also be used, for example IPX, or the like.

It will be readily apparent to one of ordinary skill in the art that many other hardware and software configurations are suitable for use with the present invention. For example, the computer system 1800 may be a desktop, portable, rackmounted, or tablet configuration. Additionally, the computer system 1800 may be a series of networked computers. Further, the use of other microprocessors are contemplated, such as Pentium™ microprocessors; Opteron™ or AthlonXP™ microprocessors from Advanced Micro Devices, Inc; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board (e.g., a programmable logic device or graphics processor unit).

Figure 19:
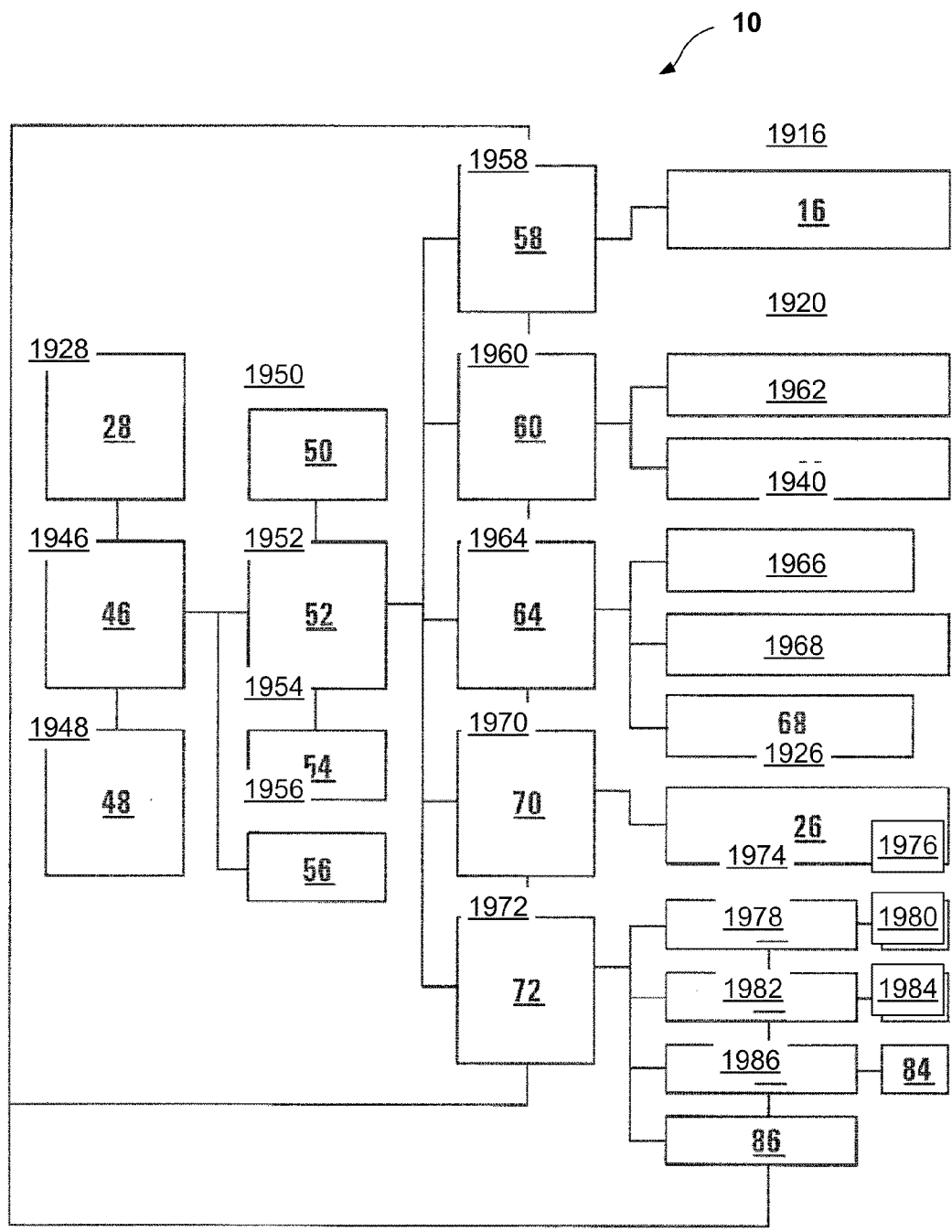
FIG. 19 is a block diagram illustrating examples of various electrical and other components of a parking meter device.

FIG. 19 shows a block diagram illustrating examples of various electrical and other components of a parking meter device 10. The parking meter device 10 has a coin accepting and validating assembly 1916, a card reading device 1920, a display 1926, touch keys 1940, and a solar panel 1928. In addition there is a power management facility 1946, a rechargeable, replaceable battery 1948, random access memory 1950, a central controller 1952, flash memory 1954 for code, a real time clock 1956, a coin validator interface 1958, a card reader interface 1960 for cards having chips and magnetic strips and for RF electronic purses, a receiver 1962 for signals such as from RF electronic purses, I/O hardware 1964, sensors, switches, and reset indicators 1966, an expiry indicator 1968, a display driver 1970 for the display 1926, a communications subsystem 1972, a cellular phone engine 1974 with its antenna 1976, a Wi-Fi engine 1978 and its antenna 1980, a GPS unit 1982 and its antenna 1984, and a serial/USB/IrDA port 1986.

The controller 1952 controls operation of the meter 10. An integrated device is used, providing RAM, ROM, and some I/O capabilities. Power-down features are desirable when selecting the microcontroller, as the meter can be put in the idle or sleep mode. A serial port is provided for debug as well as connection to an external management system.

To minimize power consumption, the controller can include a special power management facility such as power management circuitry to allow application of power to only the necessary peripherals at only the necessary times. The power management facility also provides battery status to the microcontroller to allow changes in operation based on available power, as well as health reporting to the management system.

An AMP card reader will be used as the external electrical/mechanical credit/smart card solution. One of two interfaces to the AMP device is the card head interface. A Magtek Triple Track ASIC can be used to convert the analog head signals to serial bit streams, readable by the microcontroller. The second interface to the external AMP card connector is the smart card interface. This block will provide necessary level shifting and synchronization to allow the microcontroller to bitbang the smart card interface.

The coin validator interface 1958 is an analog/digital block that connects to three coils in the coin validator 1916. The coils are energized, and the change in inductance is measured as the coin passes through each of the coils. This profile can then be correlated by the microcontroller to a database of known coins to determine the type of coin present.

The parking meter device 10 contains a number of switches such as touch keys for user input, presence detection in the card reader, and door switches. The I/O hardware 1964 allows the microcontroller to sense the state of the switches.

An expansion interface may be provided that will allow a daughter card assembly to be connected to the controller board. The communication protocol over the interface will support a minimum throughput of 20 KB/s. The expansion interface is intended to allow the addition of a communication device to the meter. Possible device types are: cellular, WiFi, Zigbee, and IrDA. Both communication signals and power will be provided through the expansion connector.

The following can be displayed on the display 26: which of the user buttons are pressed; information from a credit card; information from a smart card; which coins are passed through the coin validator.

A user (i.e., a motorist who wants to park a vehicle) can approach the meter 10 and insert either a coin or card into the meter. In either case, the user action will wake up the electronic componentry of the meter and the meter will then either validate that it is a coin, credit card, debit/ATM card, or a Smart Card or the like that was inserted. By inserting either the required number of valid coins or by inserting a card and manipulating the controls on the touch pad, the user can determine the amount of parking time to purchase. The amount of time purchased is then displayed on the electronic display. The parking meter device 10 will communicate with the credit card company wirelessly and authorize the payment using that card.

Payment via an electronic tag or electronic toll road pass can operate as follows. The meter device 10 will either sense or be advised by an electronic sensor that a motor vehicle has parked in the parking space with which the device is associated. It will then identify the electronic tag in the vehicle and after the vehicle has been in that parking space for a predetermined time (i.e. a parked interval) the device will then deduct time from the vehicle's electronic tag (i.e., account) for a predetermined length of time (i.e. a pay interval) and will display that time on the electronic device's LCD Display. After that time has been used up and the vehicle is still parked in that same parking space, the device will again deduct the required amount of money from the vehicle's electronic tag account and will display that amount of time on the device's LCD display. This process will repeat itself until the vehicle has stayed in the parking space for the maximum amount of time allowed for that parking zone or area. When the motor vehicle departs the parking space, the device will either sense or be advised by an electronic sensor that the vehicle has departed, and the device will be initialized and made ready for the next vehicle.

At a time determined by the owner or the controller of the parking area, the device will communicate with a management system. This can be done wirelessly or through a hand held device.

Figure 20:
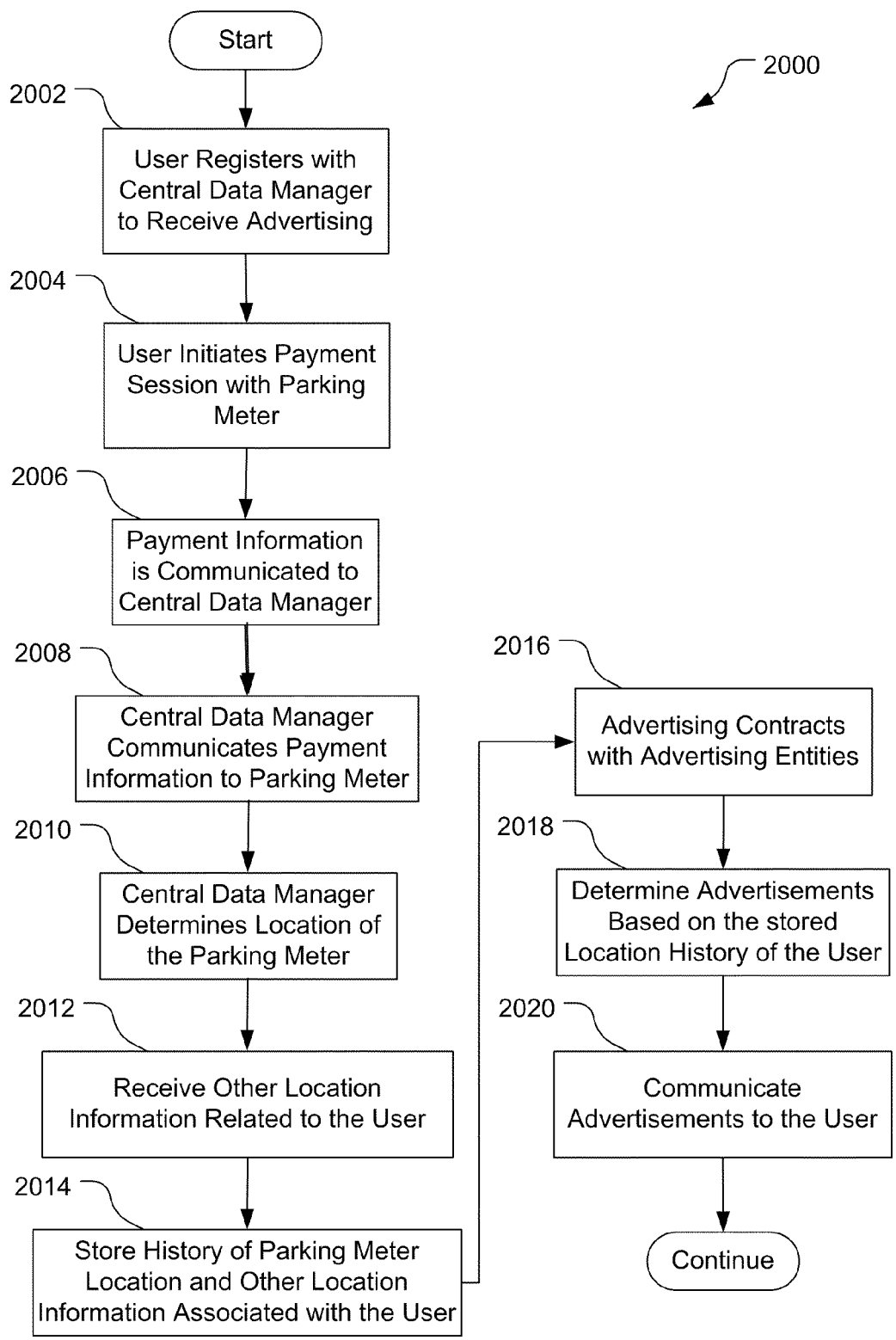
FIG. 20 is a flowchart of processing for targeting localized advertising to a user of a wireless device, where the user of the wireless device was identified as having made a payment at a meter such as the parking meters of FIGS. 1A, 1B and/or 1C in the system of FIG. 3.

Referring to FIG. 20, a flowchart of an embodiment of a process 2000 for operating a meter in the parking meter system 20 of FIG. 3 is illustrated. The process 2000 illustrates an embodiment for targeting localized advertising to a user of a wireless device, where the user of the wireless device was identified as having made a payment at a meter such as the parking meters of FIGS. 1A, 1B, and/or 1C.

With reference to FIG. 1B, FIG. 3, and FIG. 20, the process 2000 starts at block 2002 where a user registers to receive localized advertising in association with a remote electronic payment service conducted by the central data manager 26 of the parking meter system 20. The registration can be conducted over the Internet, in person, over a telecommunication system, or by any other method. At registration, the user provides credit/debit card information for a credit/debit card that will be used to make pay-by-cell payments. Optionally, the user could also provide bank account information. The user also provides phone information to enable the system to identify the registered user upon making a call. The phone information also provides the system with a cell phone number (handheld or in-vehicle) at which the user can be contacted regarding future remote payment notifications and localized advertising. The remote payment can be made using any form of electronically readable user identifier such as, for example, a credit card, a debit card, a smart card (contact or contactless), a contactless RFID tag or a driver's license. In one embodiment, the user is provided with an RFID tag that can be used to communicate with a parking meter. In such as embodiment, an RFID tag identification number is also linked to the credit/debit card and phone information of the user. This tag identification number creates an association between the credit card, the RFID tag, and the cell phone number of the user. The RFID tag can be carried on the person, placed on a key chain, in a wallet, or affixed to the back of a cell phone, for example.

After registering with the central data manager 26, the user, at block 2004, initiates a payment session, such as with a call to the payment system central data manager for payment of a parking session at a parking meter where the user is parking a vehicle. In one aspect, the user could initiate communication with the payment system by pushing a button on the user interface 18 of the parking meter. Pushing the button wakes up the control module 16 of the parking meter so as to initiate a communication session between the parking meter and the payment system. Payment can also be initiated by the user presenting a credit/debit card, smart card (contact or contactless), drivers license, or other form of electronically readable user identifier, to a reader of the meter 10.

Upon initiation of the payment communication session at the block 2004, the process 2000 continues to block 2006, where payment information is communicated to the payment system central data manager 26. In one embodiment, the user uses a cell phone to communicate the payment information (e.g., user identification and/or an amount of time to be purchased) and meter identification information to the central data manager 26. The central data manager 26 can use caller ID of the user to determine the cell phone number of the user and can then identify the credit/debit card information of the user based on the registration information maintained at a database of the payment system central data manager.

In another embodiment, the user causes a reader of the parking meter to retrieve user identification number from a credit/debit card, smart card (contact or contactless), drivers license, or other form of electronically readable user identifier. The parking meter then contacts the central data manager 26, via the radio transceiver 12, with the user identification number and with the amount of time being paid for (this could be entered by the user using the user interface 18). In embodiments where one of the parking sensors 51, 52, or 53 senses a vehicle identifier of a vehicle at the meter 10, the meter 10 transmits the vehicle identifier transmitted by the sensor to the local data manager 22 or the central data manager 26. The central data manager 26 then uses the user identification number and/or the vehicle identifier to identify the associated credit/debit card, or bank account information of the user.

Upon receiving the payment information at block 2006, the central data manager 26 processes the payment transaction. Upon successful completion of the payment transaction, the process 2000 continues to block 2008 where the central data manager 26 wirelessly communicates information confirming the successful payment of the amount of time requested by the user to the meter 10.

At block 2010, the central data manager 26 determines a location of the parking meter. The location of the parking meter can be stored in a database at the central data manager 26 and identified based on an identification number of the parking meter received from the user at the central data manager 26 along with the payment information at the block 2006. Alternatively, the location could be provided by the parking meter itself when the parking meter communicates the payment information at the block 2006.

At block 2012, the central data manager 26 receives other location information related to the user. This location information could be obtained when the user makes a call to the central data manager 26 at the block 2006 to add additional time to the parking meter. The other location information could be obtained from a position location subsystem in the phone or other wireless device of the user. The location information can also be stored with information such as time of day, day of the week, amount of time paid for and a duration of time that the user parked at the meter.

At block 2014, the central data manager 26 stores the parking meter location and the other location information related to the location of the user in a database. In this way, a history of the parking meter locations and the locations of the user can be used to identify locations frequented most by the user. The stored information can be time stamped to be used later to further target advertisements based on time of day, day of the week, day of the month, month of the year, etc.

At block 2016, the central data manager 26 accesses data about advertising contracts that have been sold to entities interested in targeting advertisements to people based on the location of the person (i.e., location-aware advertising). The entities could include commercial entities, charities, clubs, not-for-profit organizations, individuals, or any other entity that might want to advertise. The contracts would identify an area for which advertisements would be sent to the user when that user parks at a parking meter in the area, or is later identified to be located in that area or to have parked in that area. The area identified in the advertising contract could be, for example, a local area (e.g., certain city blocks), a city-wide area, a county-wide area, a state-wide area, a nation-wide area, or any other geographical area.

At block 2018, the central data manager 26 determines advertisements to be sent to the user based on the stored location history of the user and based on the contracted area associated with each advertising entity. The determination could identify the area based on the current parking meter geographic location, the current user location, past parking meter geographic location associated with the user, and/or past user locations.

In determining advertisements to be sent at block 2018, the data manager 26 can use other stored information besides the geographic location. Other stored information can include, for example, time of day, day of the week, frequency that the user parks in a general area (e.g., daily, on weekends only, randomly), predicted amount of time (e.g., an average value, mean value or expected value based on a parking history of the user) paid for by the user at meters in the general area, or a predicted time duration (e.g., an average value, mean value or expected value based on a parking history of the user) that the user parked at meters in the general area, and the like. The data manager can use information relating to parking history of the identified user on the basis of information noted above, and can also use information relating to parking history of a general population or of a particular group. For example, groups may include persons who park in the general geographical area, or persons who park at the day and time corresponding to the parking session, and the like. In general, any information useful in determining demographics or other indicators of targeted advertising for the user of the parking space my be used by the data manager in determining advertisements to be send at 2018.

For example, an advertisement for a restaurant in the vicinity of the meter where the user is parked may be sent to the user if the average (or mean or expected) time duration that the user has parked at meters in the general geographical area exceeds a threshold time such as about one hour. In contrast, an advertisement for a convenience store could be targeted to a user if the average (or mean or expected) parking time duration for the user exceeds about fifteen minutes. The general geographical area in which other meters can be considered relevant to a certain meter can vary. Meters within a predetermined number of city blocks could be considered relevant in a busy city, whereas meters within a larger area such as a mile or more could be considered relevant in a less urban area. Other relevant area distances can be used, depending on the location.

Advertisements may be targeted, or directed, in a variety of ways. For example, advertisements may be directed to users based on the immediate products and services located in the specific geographic location or general geographical area of the parking meter without concern for the person or his or her purchasing preferences. Alternatively, advertisements may be directed to users based upon analytics relating to purchase history of the person, with or without concern to the possible products and/or services in the immediate geographical area of the parking meter.

The analytics for directing advertisements may be generated in a variety of ways. For example, users may provide profile settings when they register for an account, and may be given the opportunity to make selections regarding rules or preferences for selecting the advertisements to be directed to them. Another means of determining advertisement analytics and selecting targeted ads may be provided by third parties, for example, an entity could send the parking event information comprising location and time to a company with analytics processing ability (e.g., Google) and the analytics company could use their analytical tools to select the advertisement. This processing be based on Web purchases, credit card information, personal demographics, and the like.

A user profile, such as the profile that is created upon user registration or updated information collected later, may be stored on the registered user's mobile device, which may be interrogated at the time of the parking purchase, to determine the best ads to be targeted. The user profile would likely change over time based on items purchased (with or without the registered user's mobile device or phone as the payment mechanism). The mobile device could be a personal device, such as a cell phone, or the profile information may be stored in the vehicle. The profile information could also be based on where the user parks most frequently in any given geographical area and may be based on the likelihood that the user will continue to use the stores in the immediate area where the user is likely to park.

At block 2020, the central data manager 26 communicates the advertisement(s) determined at block 2018 to the user. The advertisements could be communicated to the cell phone of the user (e.g., via text message), to an email address of the user, to a home address of the user, to an in-vehicle wireless device, or to any other geographic address of the user. The advertisement could be a textual message, a graphical message (e.g., a displayable or printable coupon), an SMS message, an audio message or any other type of message.

In some embodiments, the message communicated at the block 2020 includes a promotional code. When the user provides the message, including the promotional code, to the advertising entity, the advertising entity knows that this user received the advertisement with the pay-by-sell service. The central data manager 26 could bill the advertising customers based on the number of purchase that result from the pay-by-cell advertisements, as identified using the promotional code. Other billing systems include flat rate systems, systems based on the number of advertisements communicated, or systems based on the number of different customers to which the advertisements were communicated.

The process 2000 is exemplary and it should be understood that blocks can be omitted, rearranged and/or new blocks added.

Embodiments in accordance with the disclosure can be implemented in the form of control logic in software or hardware or a combination of both. The control logic may be stored in an information storage medium as a plurality of instructions adapted to direct an information-processing device to perform a set of steps disclosed in embodiments of the present invention. Based on the disclosure and teachings provided herein, a person of ordinary skill in the art will appreciate other ways and/or methods to implement embodiments in accordance with the disclosure.

The systems and methods discussed above involved the use of parking meters located and associated with specific parking space locations. However, the above methods and systems are applicable to monitor other scenarios where a measurable quantity of product or an amount of measurable time that a product is being consumed is associated with a unique physical location. For example, an arrival event could be a person moving up to a walk-up space in a queue, or a package arriving at a certain point on a conveyor, e.g., in a production process.

The systems and techniques described herein may be used in conjunction with a wide variety of parking meters configured to operate as described herein. For example, the targeted advertising as described herein may be carried out with suitably configured parking meters of the type described in U.S. patent application Ser. No. 12/072,524 entitled "Parking Meter" assigned to the assignee of the present invention. The contents of the aforementioned U.S. patent application Ser. No. 12/072,524 are incorporated herein in their entirety for all purposes.

The parking meter described the aforementioned U.S. patent application Ser. No. 12/072,524 includes features comprising a coin sensor, a card reader, and an electronic device electrically connected to the sensor and reader so as to receive information electronically therefrom, the electronic device having a screen to provide information visually, a telephone connection to provide receiving information in respect of a card used in respect of said card reader, and connections for at least one rechargeable battery to power the reader, sensor and device. The parking meter also includes a solar cell operatively associated with said connections to charge said battery, a housing in which the coin sensor, card reader, and electronic device are located. The housing comprises an intermediate panel set and a cover panel, wherein the cover panel is movably attached to the intermediate panel set, and a surface of the cover panel and a surface of the intermediate panel set comprise a front face, and the front face surface of the cover panel includes a control panel having a window and a plurality of buttons that operate the parking meter upon manipulation by a user, a coin slot in the front face into which coins are inserted for delivery to the sensor and then to a coin receptacle, a card slot in the front face into which a card is inserted to be read by said reader, a rear face comprising a surface of the cover panel and a surface of the intermediate panel set providing a window aperture via which said solar cell is exposed to light. The parking meter operates such that the coin sensor and the card reader are electrically linked to provide information to the electronic device to provide information of whether payment has been made, and the screen of the electronic device is visible through the window of the control panel when the cover panel is attached to the intermediate panel. One or more of these features may be incorporated into a parking meter that is otherwise configured for operation in accordance with the description herein.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be achieved in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information.

While the principles of the disclosure have been described above in connection with specific apparatuses and methods, it is to be clearly understood that this description is made only by way of example and not as limitation on the scope of the disclosure.

We claim:

1. A method of targeting advertisements, the method comprising:
receiving information related to payment for a parking session at a parking meter associated with a specific location, the payment information including information associated with a user purchasing time at the parking meter and determining the specific geographic location of the parking meter;

storing data related to the parking session at the parking meter geographic location in a database associated with parking history of the user; and determining with a processor one or more advertisements to communicate to the user based on the geographic location of the parking meter and previously stored data related to the parking history of the user.

2. The method of claim 1, further comprising:

receiving location information related to a geographic location of the user; and determining the one or more advertisements to communicate to the user based on the location information of the user.

3. The method of claim 2, wherein the geographic location of the user comprises the geographic location of the parking meter.

4. The method of claim 1, further comprising communicating the determined one or more advertisements to a wireless device of the user.

5. The method of claim 1, wherein the stored data comprises a time of the parking session, and determining the one or more advertisements to communicate to the user is further based on the time of the parking session.

6. The method of claim 1, wherein the stored data comprises a time duration of the parking session, the method further comprising:

predicting a time duration of the parking session based on historical time durations stored in the parking history of the user; and determining the one or more advertisements to communicate to the user further based on the predicted time duration.

7. The method of claim 6, wherein predicting the time duration comprises using the historical time durations stored for other meters within a predetermined distance of the parking meter associated with the specific geographic location of the parking meter.

8. The method of claim 1, wherein the stored data comprises amounts of time paid for by the user, and wherein determining the one or more advertisements to communicate to the user is further based on historical amounts of time paid for by the user.

9. The method of claim 1, further comprising:

receiving the payment information from a wireless device of the user.

10. The method of claim 1, further comprising:

receiving the payment information from a transceiver of the parking meter.

11. A payment system for parking locations, the system comprising:

a communication interface that communicates with a plurality of parking meters, each of which is associated with a predetermined geographic location corresponding to a parking location;

a processor that receives user identifying information via a communication related to payment for a parking session at a parking location, and that determines a user credit/debit card data for payment of the parking session based on the user identifying information, wherein the processor stores data related to the parking session at the geographic location of the parking meter in a database associated with parking history of the user, and determines one or more advertisements to communicate to the user based on the geographic location of the parking meter and previously stored data related to the parking history of the user.

12. The payment system of claim 11, wherein the processor receives location information related to a geographic location of the user, and determines the one or more advertisements to communicate to the user based on the location information of the user.

13. The payment system of claim 12, wherein the geographic location of the user comprises the geographic location of the parking meter.

14. The payment system of claim 11, wherein the processor communicates the determined one or more advertisements to a wireless device of the user.

15. The payment system of claim 11, wherein the stored data comprises a time of the parking session, and the processor determines the one or more advertisements to communicate to the user further based on the time of the parking session.

16. The payment system of claim 11, wherein the stored data comprises a time duration of the parking session, and the processor predicts a time duration of the parking session based on historical time durations stored in the parking history of the user, and determines the one or more advertisements to communicate to the user further based on the predicted time duration.

17. The payment system of claim 16, wherein the processor predicts the time duration using the historical time durations stored for other meters within a certain predetermined distance of the geographic location of the parking meter.

18. The payment system of claim 11, wherein the stored data comprises amounts of time paid for by the user, and the processor determines the one or more advertisements to communicate to the user further based on the historical amounts of time paid for by the user.

19. The payment system of claim 11, wherein the communication originates at a wireless device of the user and the processor receives information identifying the parking meter in the communication.

20. The payment system of claim 11, wherein the communication originates at a transceiver of the parking meter.

* * * * *